United States Patent
Gadalin et al.

(10) Patent No.: US 11,886,926 B1
(45) Date of Patent: Jan. 30, 2024

(54) MIGRATING WORKLOADS BETWEEN COMPUTING PLATFORMS ACCORDING TO RESOURCE UTILIZATION

(71) Applicant: Amazon Technologies, Inc., Seattle, WA (US)

(72) Inventors: Alexey Gadalin, Kirkland, WA (US); Alexander Gregory Bestavros, Seattle, WA (US); Anton Valter, Renton, WA (US); Ethan John Faust, Seattle, WA (US); Roland Paterson-Jones, Kommetjie (ZA)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 17/117,321

(22) Filed: Dec. 10, 2020

(51) Int. Cl.
*G06F 9/46* (2006.01)
*G06F 9/50* (2006.01)
*G06F 9/455* (2018.01)
*G06F 11/34* (2006.01)
*G06F 9/48* (2006.01)

(52) U.S. Cl.
CPC ........ *G06F 9/5077* (2013.01); *G06F 9/45558* (2013.01); *G06F 9/4856* (2013.01); *G06F 11/3409* (2013.01); *G06F 2009/4557* (2013.01)

(58) Field of Classification Search
CPC .................................................. G06F 9/5077
USPC ....................................................... 718/104
See application file for complete search history.

(56) References Cited

U.S. PATENT DOCUMENTS

| | | | | |
|---|---|---|---|---|
| 7,551,623 | B1* | 6/2009 | Feroz | H04L 47/562 709/224 |
| 8,615,579 | B1* | 12/2013 | Vincent | G06F 9/5094 709/224 |
| 8,842,687 | B1* | 9/2014 | Jackson | H04L 49/557 370/419 |
| 9,275,355 | B2* | 3/2016 | Birkler | G06Q 10/06 |
| 9,846,590 | B2* | 12/2017 | Chen | G06F 9/45533 |
| 9,959,146 | B2* | 5/2018 | Ahuja | G06F 9/5094 |
| 10,097,627 | B1* | 10/2018 | Gafton | G06F 9/45558 |
| 10,461,774 | B2* | 10/2019 | Balle | G06F 9/544 |
| 11,138,049 | B1* | 10/2021 | Featonby | G06F 11/3447 |
| 11,340,939 | B1* | 5/2022 | Barker, Jr. | G06F 3/0647 |
| 2003/0061263 | A1* | 3/2003 | Riddle | H04L 47/828 718/104 |

(Continued)

*Primary Examiner* — Mehran Kamran
(74) *Attorney, Agent, or Firm* — Lee & Hayes, P.C.

(57) ABSTRACT

Techniques and technologies for migrating workloads between different VM instance types based on changes in resource utilization over a period of time. Selecting one VM instance type to host workloads can result in use of a VM instance type that is optimized for the workload during one timeframe of a period of time, but is over-provisioned or under-provisioned for the workload during another timeframe of a period of time. Accordingly, a service provider network may analyze historical utilization patterns of workloads over a period of time, and identify different VM instance types that are optimized for the workloads during different timeframes of the period of time. The service provider network may then cause the workloads to be migrated between the different VM instance types over the period of time such that the workloads are hosted on VM instances that are optimized for the current resource utilization of the workloads.

20 Claims, 13 Drawing Sheets

(56) References Cited

U.S. PATENT DOCUMENTS

| | | | | |
|---|---|---|---|---|
| 2007/0250838 | A1* | 10/2007 | Belady | G06F 11/3452 |
| | | | | 714/E11.197 |
| 2007/0271560 | A1* | 11/2007 | Wahlert | G06F 8/61 |
| | | | | 718/1 |
| 2013/0185729 | A1* | 7/2013 | Vasic | G06F 9/5072 |
| | | | | 718/104 |
| 2015/0339156 | A1* | 11/2015 | Vincent | G06F 9/4856 |
| | | | | 718/1 |
| 2015/0347183 | A1* | 12/2015 | Borthakur | G06F 9/5088 |
| | | | | 718/105 |
| 2016/0028649 | A1* | 1/2016 | Herington | H04L 47/783 |
| | | | | 709/226 |
| 2016/0162308 | A1* | 6/2016 | Chen | G06F 9/45558 |
| | | | | 718/1 |
| 2016/0164738 | A1* | 6/2016 | Pinski | H04L 43/0888 |
| | | | | 709/224 |
| 2016/0378532 | A1* | 12/2016 | Vincent | G06F 9/5088 |
| | | | | 718/1 |
| 2018/0024860 | A1* | 1/2018 | Balle | G06F 15/161 |
| | | | | 718/104 |
| 2018/0060134 | A1* | 3/2018 | Bianchini | G06F 9/5077 |
| 2018/0084036 | A1* | 3/2018 | Birkestrand | H04L 67/10 |
| 2018/0097874 | A1* | 4/2018 | Sampathkumar | H04L 41/0897 |
| 2019/0028407 | A1* | 1/2019 | Perumal Vijayan | H04L 41/147 |
| 2019/0158417 | A1* | 5/2019 | Aronovich | H04L 43/0817 |
| 2019/0384626 | A1* | 12/2019 | Inabattini | G06F 9/5083 |
| 2020/0028935 | A1* | 1/2020 | Sahay | G06F 9/5088 |
| 2020/0104189 | A1* | 4/2020 | Gopalan | G06F 9/5088 |
| 2020/0133706 | A1* | 4/2020 | Koehler | G06F 9/45558 |
| 2020/0250002 | A1* | 8/2020 | Gururaj | G06F 9/5027 |
| 2020/0394063 | A1* | 12/2020 | Kelly | G06F 9/452 |
| 2021/0278986 | A1* | 9/2021 | Yamamoto | G06F 9/5083 |
| 2021/0389994 | A1* | 12/2021 | Malleni | G06F 9/5077 |

\* cited by examiner

400

DEFINE MIGRATION RULES

402 — Workload – Specify on which workload this rule is to be applied

[ Workload_1 ▼ ]

404 — Performance Targets – The desired resource utilization by your workload 406 — Compute:

Low Cost ——————————○—————— Increase Performance

408 — Memory:

Low Cost ————————————————○—— Increase Performance

410 — Storage:

Low Cost ————————————————○—— Increase Performance

412 — Network I/O:

Low Cost ————○—————————————— Increase Performance

414 — Processor Type – The processor(s) that you would like your instances to run on

[ ARM-based processor ▼ ]

416 — Instance Types – Indicate what instance types can be used in your migration schedule

[ Compute-Optimized Instances ▼ ]

418 — ○ Automated Migration – Automate the migration of your workload to different instance types without further input 420 — ⦿ Manual Migration – Review and approve recommended migration schedules prior to implementation

[ Cancel ]  [ Generate Schedule ] — 422

RUN A WORKLOAD USING A FIRST VIRTUAL COMPUTING RESOURCE THAT IS PROVISIONED ON FIRST COMPUTING RESOURCES OF A SERVICE PROVIDER NETWORK, THE FIRST VIRTUAL COMPUTING RESOURCE BEING OF A FIRST VIRTUAL COMPUTING RESOURCE TYPE
702

RECEIVE HISTORICAL UTILIZATION DATA THAT INDICATES UTILIZATION OF THE FIRST COMPUTING RESOURCES BY THE WORKLOAD OVER A PREVIOUS PERIOD OF TIME
704

ANALYZE THE HISTORICAL UTILIZATION DATA TO IDENTIFY A HISTORICAL UTILIZATION PATTERN IN AMOUNTS OF THE FIRST COMPUTING RESOURCES UTILIZED BY THE WORKLOAD DURING THE PREVIOUS PERIOD OF TIME
706

IDENTIFY, FROM THE HISTORICAL UTILIZATION PATTERN, A FIRST TIMEFRAME IN THE PREVIOUS PERIOD OF TIME DURING WHICH A FIRST AMOUNT OF THE FIRST COMPUTING RESOURCES IS UTILIZED BY THE WORKLOAD
708

IDENTIFY, FROM THE HISTORICAL UTILIZATION PATTERN, A SECOND TIMEFRAME IN THE PREVIOUS PERIOD OF TIME DURING WHICH A SECOND AMOUNT OF THE FIRST COMPUTING RESOURCES IS UTILIZED BY THE WORKLOAD
710

MIGRATING WORKLOADS BETWEEN COMPUTING PLATFORMS ACCORDING TO RESOURCE UTILIZATION

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a graphical user interface through which a user of a service provider network can define parameters for a migration rule according to which VM instances types are selected for the workload to be migrated between.

FIGS. 7A and 7B collectively illustrate a flow diagram of an example method for a service provider network to receive utilization data for a workload, identify a historical utilization pattern by a workload, generate a migration schedule using the historical utilization pattern, and migrate a workload according to the migration schedule.

DETAILED DESCRIPTION

Figure 1:
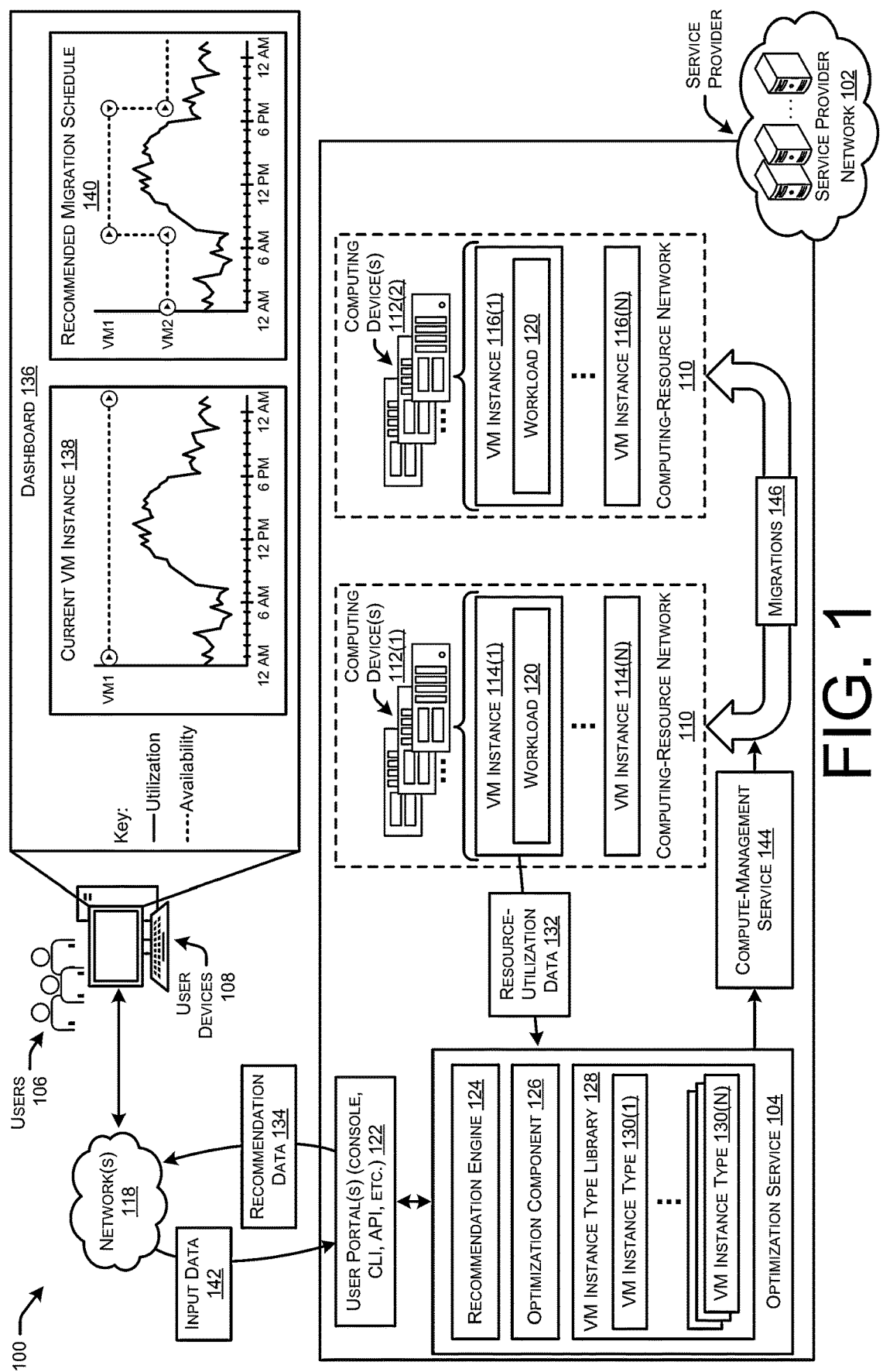
FIG. 1 illustrates a system-architecture diagram of an example environment in which an optimization service of a service provider network determines and recommends VM instance types that are optimized to support workloads on behalf of users. The optimization service may provide the users with a recommendation to migrate their workloads between multiple VM instance types over a period of time based on the workload utilizing different amounts of computing resources in different timeframes of the period of time.

To increase the utilization of the computing resources, virtualization technologies may allow a single physical computing device to host multiple virtual computing resources. For example, a single computing device can host multiple instances of virtual machines (VM) (also referred to herein as "virtual machine instances" or "VM instances") that appear and operate as independent physical computing devices for users, but each share or are allocated portions of the computing resources of the single, underlying physical computing device. In this way, rather than having a single user or process underutilize the resources of a physical computing device, multiple users or processes can utilize the resources of the physical computing device to increase resource utilization.

To further increase the utilization of the computing resources, and also to more effectively meet the computing resource needs of users, service provider networks may offer a variety of different types of virtual machines. Specifically, a service provider network may offer a selection of VM instance types that are optimized (in terms of quantity of individual resources, and ratio of different resources to one another) to support different use cases on behalf of users. In such examples, the different VM instance types may be allocated different amounts, and/or different combinations, of the computing resources of underlying physical computing devices to provide users with flexibility to choose a VM instance that is more appropriately optimized to support their computing resource needs.

The present disclosure relates to a cloud-based workload optimization service that can transparently migrate customer workloads between different instance types, for example between a burstable instance type that has a baseline guarantee and then shares resources above that baseline (e.g., for bursting) with other workloads and a dedicated instance type that has guaranteed availability of its full resource allocation, and vice versa. Service providers offer various network-based (or "cloud-based") services to users to fulfill computing needs of the users. These service providers may operate service provider networks that include clusters of managed servers (or other hardware-based computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user.

As noted above, the service provider networks may utilize virtualization technologies such that the computing devices can each host multiple VM instances that appear and operate as independent computing devices to support workloads of users. Rather than allocating all of the computing resources of a physical computing device to support a single workload, the computing resources of a physical computing device can be allocated amongst multiple VM instances that support different workloads. The service provider network supports many different types of workloads on behalf of users, and these workloads often have different computing resource needs. As described herein, a workload is implemented by a designated set of computing resources and the workload itself can be considered as code or logic that performs functionality using the computing resources. The service provider network may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of a service provider network.

In light of the different workloads that are supported on behalf of users, the service provider network may provide users with a selection of a variety of VM instance types optimized to support different workloads. Generally, each VM instance type may be allocated a different amount of computing resources, and/or different combination of computing resources, such that the VM instance types are optimized to support different workloads. As used herein, computing resources refers to compute, memory, storage, networking, and, in some implementations, graphics processing. As an example, one VM instance type may be allocated a larger amount of compute (e.g., processor cycles) and be optimized to support compute-heavy workloads, whereas another VM instance type may be allocated a larger amount of storage (e.g., disk space) and be optimized to support storage-intensive workloads. In this way, users can select a VM instance type or platform that is more optimized to support their workload, thereby increasing the performance of the workload while reducing underutilization of computing resources by the service provider network.

Generally, an increase in the complexity and diversity of VM instance types offered by the service provider network is advantageous and results in a higher likelihood that workloads are supported by a more optimized VM instance. While a large variety of VM instance types is advantageous for various reasons (e.g., efficient utilization of computing resources, high performance for workloads, etc.), it also may become difficult for users, particularly new users, to select a suitable or appropriate VM instance type to support their workload(s). For example, users may attempt to map out the computing resource needs of their workload and then peruse the offering of VM instance types to locate a VM instance type that seems appropriate for their needs. In other examples, users may go through a time-consuming trial-and-error process to analyze performance of their workloads using different VM instance types. However, not only is this time consuming, but it may also result in users having their workloads hosted on VM instance types that are either overutilized and resource constrained, or underutilized and resulting in computing resources that may be unused and sitting idle. As an example, users may be overly cautious and select an oversized VM instance type to help ensure that their workloads are never resource constrained, which may result in low utilization of computing resources of the service provider network.

In some instances, service provider networks may provide an optimization service to help users optimize the selection, configuration, and utilization of VM instance types to support their workloads. The optimization service may provide recommendations to users that help improve performance of their workloads, and that also increase the aggregate utilization of computing resources of the service provider network. However, workloads often utilize different amounts of computing resources over a period of time. Thus, a VM instance types that is optimized for hosting a workload during one timeframe in a period of time might be over-provisioned (e.g., allocated too many resources to adequately support the workload), or under-provisioned (e.g., allocated too few resources to adequately support the workload) in another timeframe of the period of time. As a specific example, a user might offer a virtual-desktop application that experiences high levels of traffic during the workday, but much lower levels of traffic in hours outside of the workday. Thus, the workloads supporting the virtual-desktop application might be on a VM instance type that is over-provisioned during the non-working hours of the day, which results in wasted or unused computing resources.

This disclosure describes techniques and technologies implemented by an optimization service of a service provider network for migrating workloads of users between different VM instance types based on changes in resource utilization over a period of time. Selecting a single VM instance type to host workloads can result in use of a VM instance type that is optimized for the workload during one timeframe of a period of time, but is over-provisioned or under-provisioned for the workload during another timeframe of a period of time. Accordingly, the optimization service may analyze historical utilization patterns of workloads over a period of time, and identify different VM instance types that are optimized for the workloads during different timeframes of the period of time. The optimization service may then cause the workloads to be migrated between the different VM instance types over the period of time such that the workloads are hosted on VM instances that are optimized for the current resource utilization of the workloads.

In some instances, the service provider network may already be hosting workloads of a user using a particular VM instance type. In such examples, the user may opt-in to allow the optimization service to analyze historical resource-utilization data of the workloads. For instance, the optimization service may analyze CPU utilization, memory utilization, storage utilization, and/or network I/O utilization of the workload over time. In some instances, the optimization service may identify patterns in the resource utilization over periods of time. For instance, the optimization service may identify patterns of increases and/or decreased in resource utilization in each day, week, month, etc. Within each period of time in which patterns are detected, there may be timeframes where the workloads consume relatively significantly different amounts of the different resource types.

The optimization service may identify timeframes during which the resource utilization changes by more than some threshold, and determine what VM instance types are optimized for the workloads during the different timeframes. Thus, over the period of time, there may be two or more timeframes where it would be advantageous to host the workloads on different VM instance types. The optimization service may identify the VM instance types that are optimized for the workloads during the different timeframes, and generate a migration schedule according to which the workloads are to be migrated between VM instance types such that the workloads are hosted on optimized VM instance types in the different timeframes.

A compute-management service may be provided with the migration schedule and be configured to migrate the workloads according to the migration schedule. The service provider network may perform live migrations of the workloads such that the application being supported by the workloads does not suffer downtime. In some instances, the compute-management service may detect changes in the resource utilization by the workloads, and use the migration schedule to determine whether the changes are going to require the workloads to be migrated to a new VM instance type. That is, the compute-management service may determine that a detected increase or decrease in resource utilization is expected based on the migration schedule, and that the workloads do in fact need to be proactively migrated to the new VM instance type.

As described in more detail below, the optimization service may determine VM instance types that are optimized to host workloads based on resource-utilization data for the workloads in different timeframes. For instance, the optimization service may have collected resource-utilization data for the workloads, and based on the resource-utilization characteristics (or "resource-consumption characteristics") of the workloads, identify VM instance types that have been allocated different amounts of computing resources, and/or different combinations of computing resources, such that the VM instance types are optimized to support the resource-utilization characteristics of the workloads in different timeframes.

The techniques described herein are equally applicable for any number of VM instances and/or workloads. For example, a workload may be supported by a VM instance, by multiple VM instances, and/or by a fleet of VM instances. In some examples, one or more workloads may be supported by a fleet of VM instances that are scalable to support increases and/or decreases in use, and may be placed behind one or more load balancing devices of the service provider network. In such examples, the techniques described herein may be applicable to all VM instances in a fleet that support various instances of the same workload.

This application describes techniques that increase the overall utilization of computing resources provided by servers or other hardware devices, such as CPU, GPU, memory, disk, and/or network availability. The optimization service may determine VM instance types that are more appropriately tailored, or allocated a more appropriate amount of computing resources, to support workloads in different timeframes of a period of time. In this way, the techniques described herein help prevent underutilization of computing resources of a service provider network, which reduces the amount of computing resources that are (i) allocated or reserved for VM instances, but (ii) sit idle or unused because the VM instances are oversized for the workload they support. Additionally, the techniques improve the performance of workloads by intelligently placing workloads on VM instance types that are optimized to support the workloads. The optimization service may place the workloads on VM instances to help ensure that the workloads have sufficient amounts of computing resources available, of the types of computing resources needed, to help avoid over constrained VM instance types and workloads across different timeframes.

Although the techniques described herein are with reference to virtual machines or VM instances and virtual machine types, in some examples, the techniques are applicable to any type of virtual computing resource. For example, the techniques are generally applicable to any type of virtual computing resource that is allocated underlying portions of physical computing resources and executes within a virtual machine, or independently executes on the physical computing resources. Such virtual computing resources can include a container executing on a physical resource, a virtual machine instance running one or more containers, processes, software, and/or any other executable that is allocated portions of physical computing resources.

The service provider network described herein, such as a cloud provider network, may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an optimization service of a service provider network determines and recommends VM instance types that are optimized to support workloads on behalf of users. The optimization service may provide the users with a recommendation to migrate their workloads between multiple VM instance types over a period of time based on the workload utilizing different amounts of computing resources in different timeframes of the period of time.

As illustrated, a service provider network 102 may be operated and/or managed by a service provider. The service provider network 102 may provide various services to users 106 to fulfil their computing resource needs, such as cloud-based computing resources. For example, the service provider network 102 may provide cloud-based, scalable, and network accessible compute power services, storage services, database services, and/or other services. Users 106 may utilize user devices 108 to subscribe for use of the computing resources and/or services provided by the service provider network 102. The service provider network 102 may include an optimization service 104 that is configured to select VM instance types to support workloads of the users 106 which optimize performance of the workloads, and refrain from underutilization or overutilization of the computing resources that support the VM instances and workloads.

Generally, the optimization service 106 may recommend optimal compute resources for users' workloads to reduce costs and improve performance by using machine learning to analyze historical utilization metrics. Over-provisioning compute can lead to unnecessary infrastructure cost and under-provisioning compute can lead to poor application performance. The optimization service 106 may help users choose optimal instance types, including those that are part of an auto scaling group, based on utilization data. By applying the knowledge drawn from running diverse workloads in the cloud (or service provider network 102), the optimization service 106 identifies workload patterns and recommends optimal compute resources. The optimization service 106 analyzes the configuration and resource utilization of a user's workload to identify dozens of defining characteristics, for example, if a workload is CPU-intensive, or if it exhibits a daily pattern or if a workload accesses local storage frequently. The optimization service 106 processes these characteristics and identifies the hardware resource headroom required by the workload. The optimization service 106 infers how the workload would have performed on various hardware platforms (e.g. VM instances types) and offers recommendations. Users can opt-in to the optimization service 106 via a console.

The service provider network 106 may span across different geographic regions, and include or be associated with a computing-resource network 110 that includes clusters of managed computing devices 112 (e.g., servers) stored in data centers located across the different geographic regions. In this way, users 106 who have subscribed for use of the network-based services supported by computing resources in the data centers need not invest in and maintain the computing infrastructure required to implement the various services that they may need. In some examples, users 106 of the service provider network 102 may access or utilize computing resources of the computing devices 112 in the data centers located in different geographic regions such that users 106 located in these different geographic regions are provided with access these resources and services.

Generally, the computing devices 112 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing devices 112 may be various types of computing devices, such as devices that have different chip set generations, are from different vendors, have different hardware architectures, and so forth.

Thus, the computing resources of the computing-resource network 110 provided by the computing devices 112 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices 112 may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

As illustrated, the computing devices 112 may each support VM instances that may be different types of VM instances provided by the service provider network 102. For instance, computing devices 112(1) may support one or more VM instances 114(1)-114(N) and 116(1)-116(N) that are of different VM instance types. Rather than allocating all the computing resources of an entire computing device 112 to support a workload 120 for the user 106, the service provider network may include a virtualization layer (e.g., containing one or more hypervisors) that includes instances of "virtual" computing resources (also referred to interchangeably herein as "virtual machines" or "VM instances") that represent the allocated portions of the physical computing resources of the computing devices 112. These VM instances 114/116 may emulate computing devices 112 to operate and support workloads, and may have their own operating systems, processing capabilities, storage capacity, and network connections or interfaces.

Users 106 may create user accounts with the service provider to utilize the resources and services of the service provider network. The users 106 may utilize their user devices 108 to communicate over one or more networks 118 (e.g., WANs, PANs, LANs, etc.) with the service provider network 102. The user devices 106 may comprise any type of computing device configured to communicate over network(s) 118, such as mobile phones, tablets, laptop computers, desktop computers, televisions, servers, and/or any other type of computing device. The users 106 may desire that the service provider network 102 host or support workloads 120 on the computing-resource network 110 that is managed by the service provider. Accordingly, the users 106 may, via their user account, request that a workload be launched on their behalf, and provide input data 142 via one or more user portals 122 (e.g., web console, command line interface (CLI), application programming interface (API), etc.). The user portals 122 may provide the input data 142 to the optimization service 104 which includes a recommendation engine 124, an optimization component 126, and a VM instance type library 128 storing indications of different VM instance types 130(1)-130(N) offered by the service provider network.

As described herein, a workload 120 may generally include a designated collection or grouping of computing resources (e.g., compute, memory, storage, networking, etc.) in the computing-resource network 110, and the code or logic that performs functionality using the computing resources. The service provider network 102 may support a wide variety of workloads 120, such as web servers, databases, customer-facing applications, distributed data stores, batch processing, machine/deep learning training and/or inference, online gaming, video encoding, memory caching, and/or any other type of workload that can be supported by computing resources of the computing-resource network 110.

The optimization service 104 includes the optimization component 126 that is configured to determine one or more VM instance types 130 that are optimized to support the workload 120 on behalf of the user 106. The service provider 102 may offer a wide variety of VM instance types 130 that differ based on (i) the amounts of physical computing resources allocated for use by the VM instance type 130, and/or (ii) the combinations of the types of physical computing resources allocated for use by the VM instance type 130. In some instances, there may be at least five high-level categories or types of computing resources included in the computing-resource network 110 and provided by the computing devices 112, which are CPU, GPU, memory, storage, and network throughput. The different VM instance types 130 are allocated different amounts and/or combinations of these, and potentially other, computing resources. For example, the VM instance types 130 may be allocated use of larger or smaller amounts of the different resource types to be optimized support workloads 120 with various computing resource utilization characteristics.

For example, the VM instance types 130 can include compute optimized types, memory optimized types, accelerated optimized types, storage optimized types, and/or network throughput optimized types. As a specific example, a VM instance type 130 that is compute optimized may be allocated use of 4 vCPUs of 3.0 GHz processors where each core can run at up to 3.5 GHz, but only be allocated 8 gibibytes (GiB) of memory. Conversely, a VM instance type 130 that is memory optimized may be allocated 32 GiB of memory, but only run on a 3.1 GHz processor with 2 vCPUs.

In addition to optimizing the VM instance types 130 by varying the amounts or ratios of computing resource types allocated for use by the different VM instance types 130, the service provider may further include different sizes of VM instance types 130 for workloads 120 that require more or less computing resources at various ratios. For example, a smaller VM instance type 130 may be allocated 2 vCPUs of a 3.0 GHz processor and 4 GiB of memory, and an extra-large VM instance type 130 may be allocated 72 vCPUs on the 3.0 GHz processor and 144 GiB of memory (e.g., 36× the vCPUs and memory allocation of the smaller type).

Accordingly, the service provider may offer a wide selection of VM instance types 130 that are included in a VM instance type library 128 in which a user 106 can search and select a desired VM instance type 130 for their workload 120. Traditionally, the users 106 would have to mentally map out the computing resource needs of their workload 120 and peruse the library 128 offering of VM instance types 130 to locate a VM instance type 130 that seems appropriate for their needs. However, not only is this time consuming, but it may also result in users 106 having their workloads hosted on VM instance types 130 that are either overutilized and resource constrained, or underutilized and resulting in computing resources that may be unused and sitting idle.

The optimization component 126 may be configured to determine one or more VM instance types 130 that are optimized to host or support the workload 120 across different timeframes. For example, the optimization component 126 may generally map resource-utilization data 132 of the workload 120 to one or more VM instance types 130 that are optimized, to support the resource utilization of the workload 120. In some examples, and described in more detail with respect to FIG. 2, the optimization component 126 may generate predefined workload categories or groups that generally represents higher-level categories of workloads 120 commonly hosted on the computing-resource network 110. For example, one workload category may be a database category and represent different database workloads supported by the computing-resource network 110. Another category may be a web-server category and represent the different web-server workloads supported by the computing-resource network 110. The optimization component 126 may analyze the different types of workloads 120 supported across the computing-resource network 110 on behalf of the user accounts and define (e.g., machine learning, clustering, etc.) a set of workload categories that are generally representative of the different workloads 120 supported by the computing-resource network 110.

Further, the optimization component 126 may determine one or more resource-utilization models for each workload category that represent the general "shape" or characteristics of the resource utilization by the workloads 120 represented in each category. That is, each workload category may be associated with one or more resource-utilization models that are generally representative of the resource consumption by workloads 120 in the workload category. The optimization component 126 may further determine, based on the resource-utilization models (or by user account selection) which of the VM instance types 130 are optimized for the different workload categories. As an example, VM instance type 130 that are compute optimized may be associated with a high-performance web server workload category, whereas a VM instance type 130 that is memory optimized may be associated with a higher-performance database category. In this way, workload categories may be generated or predefined that are representative of the resource-utilization characteristics for the workloads 120 that are supported by the computing-resource network, and also indicate the VM instance types 130 that are optimized to support the workloads for each workload category.

The optimization component 126 may map the resource-utilization data 132 to at least one of the predefined workload categories in various ways. For instance, the resource-utilization data 132 of the workload 120 may be mapped by the optimization component 126 to a workload category. After the optimization component 126 maps the resource-utilization data 132 to one of the predefined workload categories, the recommendation engine 124 may provide recommendation data 132 to the user device 108 that includes at least a recommendation of a VM instance type 130 that is optimized to support their workload 120.

As noted above, the optimization component 126 may further identify different VM instance types 130 that are optimized to host the workload 120 in different timeframes over a period of time. For instance, the optimization component 126 may analyze the resource-utilization data 132 that includes historical resource-utilization data 132 of the workloads 120. For instance, the optimization component 126 may analyze CPU utilization, memory utilization, storage utilization, and/or network I/O utilization of the workload 120 over time. In some instances, the optimization component 126 may identify patterns in the resource-utilization data 132 over periods of time. For instance, the optimization component 126 may identify patterns of increases and/or decreased in resource utilization in each day, week, month, etc. Within each period of time in which patterns are detected, there may be timeframes where the workloads 120 consume relatively significantly different amounts of the different resource types.

The optimization component 126 may identify timeframes during which the resource-utilization data 132 indicates utilization changes by more than some threshold, and determine what VM instance types 130 are optimized for the workloads 120 during the different timeframes. Thus, over the period of time, there may be two or more timeframes where it would be advantageous to host the workloads 120 on different VM instance types 130. The optimization component 126 may identify the VM instance types 120 that are optimized for the workloads 120 during the different timeframes, and generate a migration schedule according to which the workloads 120 are to be migrated between VM instance types 130 such that the workloads 120 are hosted on optimized VM instance types 130 in the different timeframes.

In some instances, the optimization service 104 may provide the user devices 108 with recommendation data 134 that includes a recommendation for the user 106 to migrate their workloads according to a migrations schedule. As illustrated, a dashboard 136 may be accessible via the user portal(s) 122, and the user may view a first representation 138 of the utilization and availability of the workload 120 being hosted on the current VM instance type 130 over a period of time (e.g., a day in this example, but could be any period of time). As shown, the availability of resources provided by the current VM instance type 130 for the workload 120 is greater than the utilization, and there is a timeframe where the utilization is much higher than other timeframes during the period of time. The utilization represented may be of any computing resource type.

The recommendation data 134 may further include a recommendation of a migration schedule for the workload 120. As illustrated, the dashboard 136 may further provide the user 106 with access to view a second representation 140 of a recommended migration schedule. The recommended migration schedule includes a recommendation that the user 106 utilize two different VM instance types 130 to host their workloads 120 for different timeframes within the period of time. For instance, one VM instance type 130 (which may be the current VM instance type 130) may be utilized for a timeframe when utilization is relatively high, and a second VM instance type 130 may be recommended for one or more other timeframes when utilization of resources by the workloads 120 drops. The user 106 is able to see the visual depiction of how the different VM instance types 130 are more appropriately tailored for hosting the workloads 120 in the different timeframes. In an example, the recommended migration schedule 140 may include a plan to transparently migrate customer workloads between different instance types, for example between a burstable instance type that has a baseline guarantee and then shares resources above that baseline (e.g., for bursting) with other workloads and a dedicated instance type that has guaranteed availability of its full resource allocation, and vice versa.

In examples where a user 106 elects to opt-in for use of the migration schedule, the user 106 may provide the optimization service 104 with an indication that he or she would like to begin migrating their workloads 120 between the different VM instance types 130, and according to the migration schedule. Additionally, or alternatively, the user 106 may make changes to the recommended migration schedule and/or recommended VM instance types 130 and provide those changes as well. The optimization service 104 may then instruct a compute-management service 144 to begin migrating the workloads 120 of the user 106 according to the finalized migration schedule.

Thus, the compute-management service 144 may be provided with the migration schedule and be configured to migrate the workloads 120 according to the migration schedule. The compute-management service 144 may perform live migrations 146 of the workloads 120 such that the workloads 120 do not suffer downtime. In some instances, the compute-management service 144 may detect changes in the resource utilization by the workloads 120, and use the migration schedule to determine whether the changes are going to require the workloads 120 to be migrated to a new VM instance type 130. That is, the compute-management service 144 may determine that a detected increase or decrease in resource utilization is expected based on the migration schedule, and that the workloads 120 do in fact need to be proactively migrated to the new VM instance type 130. The compute-management service 144 may migrate the workloads 120 from being hosted on the VM instances 114 that are of a first VM instance type, to being hosted on the VM instances 116 that are of a second VM instance type 130, based on the migration schedule. Although illustrated as being migrated back-and-forth between only two different VM instance types 130, the workloads may be migrated any number of times and between any number of different VM instance types 130.

As described herein, a migration 146, including a live migration, reboot migration, etc., refers to moving virtual machine instances (and/or other resources) between hosts in a cloud computing network, or between hosts outside of the cloud computing network and hosts within the cloud. There are different types of migration including live migration and reboot migration. Techniques for various types of migration involve managing the critical phase—the time when the virtual machine instance is unavailable to the customer—which should be kept as short as possible.

During a reboot migration, the customer experiences an outage and an effective power cycle of their virtual machine instance. For example, a control plane service can coordinate a reboot migration workflow that involves tearing down the current domain on the original host (the "source host") and subsequently creating a new domain for the virtual machine instance on the new host (the "target host"). The instance is rebooted by being shut down on the original host and booted up again on the new host.

Live migration refers to the process of moving a running virtual machine instance between different physical machines without significantly disrupting the availability of the virtual machine instance (e.g., the down time of the virtual machine instance is not noticeable by the end user). When the control plane initiates a live migration workflow it can cause the creation of a new "inactive" domain associated with the instance on a target host, while the original domain for the instance continues to run as the "active" domain on the source host.

Memory (including any in-memory state of running applications), storage, and network connectivity of the virtual machine are transferred from the original host with the active domain to the destination host with the inactive domain. For example, a local migration manager running on the source can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of the control plane, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded. Additional details relating to virtual machine instance migration are provided in U.S. application Ser. No. 16/442,325 (U.S. Pat. App. Pub. No. 2019/0310880), titled "MANAGED ORCHESTRATION OF VIRTUAL MACHINE INSTANCE MIGRATION," which is incorporated herein by reference in its entirety.

Generally, the optimization service 104, and components thereof, may comprise software, firmware, and/or other logic that is supported one computing device, or across more computing devices in the service provider network 102. Additionally, the optimization service 104 may comprise a system of other devices, such as software agents stored locally on VM instances.

Figure 2:
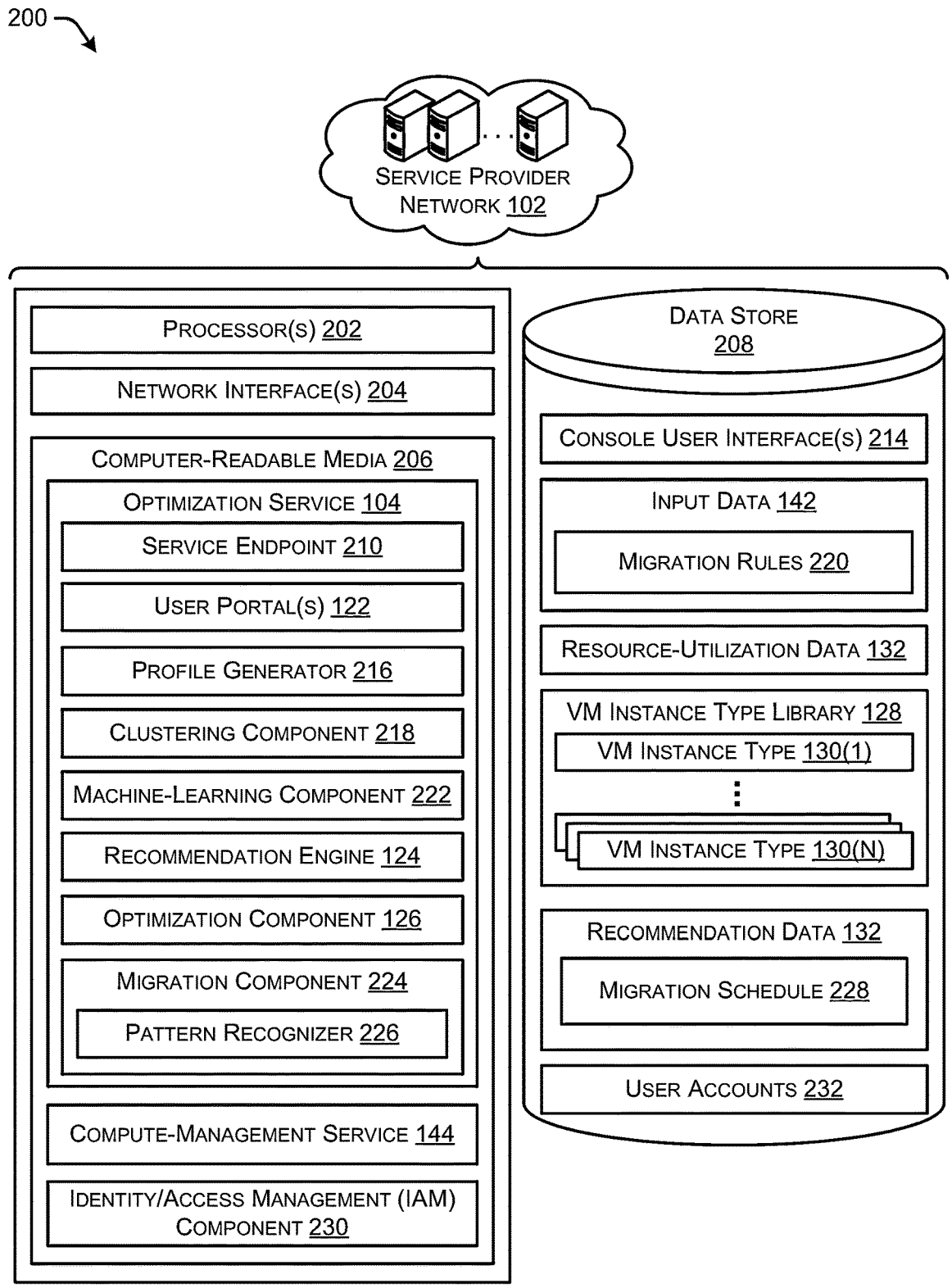
FIG. 2 illustrates a component diagram of example components of a service provider network that help optimize the selection and utilization of multiple VM instance types to support workloads on behalf of users according to a migration schedule.

FIG. 2 illustrates a component diagram 200 of example components of a service provider network 102 that help optimize the selection and utilization of multiple VM instance types 130 to support workloads 120 on behalf of users 106 according to a migration schedule.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s) 108, computing devices 112, and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the optimization service 104 described herein. For instance, the computer-readable media 206 may store a service endpoint 210 that may include a stack that supports internet routable APIs to describe, generate, delete, and make recommendations using resource-utilization data 132 or characteristics. Generally, this service stack of the service endpoint 210 may support APIs, CLI, consoles, SDKs, and/or any other function through which the components of the optimization service call, and/or the user devices 108.

The computer-readable media 206 may further store the user portal(s) 122 through which users 106 can provide input via their user accounts and user devices 108. In some examples, the user portal(s) 122 include an interface through which users 106 can define parameters or rules for their migration schedules. Additionally, the user portal(s) 122 may present one or more console user interface(s) 214 (or UIs 214) through which the users 106 may provide input data 142 that defines or describes parameters around a migration schedule for their workloads 120. The user portal (s) 122 may receive calls from APIs, CLIs, SDKs, and/or other electronic means or methods.

The computer-readable media 206 may further store a profile generator 216 that generates a snapshot of profiling data, such as a resource-utilization characteristic included in the resource-utilization data 132, at regular intervals. The profile generator 216 may then utilize these snapshots to create a resource fingerprint for a workload 120, which generally represents the resource consumption of the workload 120. These fingerprints or profiles may be included in the resource-utilization data 132 and be mapped to VM instance types 130 and/or workload categories for the workload 120. The profile generator 216 may further accumulate and average all resource-utilization data 132 for a fleet of VM instances 114 in order to generate a consumption fingerprint for a fleet of VM instances 114.

The computer-readable media 206 may further store a clustering component 218 configured to create or generate the workload categories. The clustering component 218 may obtain historical (or near-real time) utilization data 132 and cluster the workloads 120 for some or all of the user accounts of the service provider network 102 to generate the workload categories that are generally representative of all the workloads 120 in the service provider network 102.

The computer-readable media 206 may further store a machine-learning (ML) component 222 configured to generate the resource-utilization models for each of the workload categories. The ML component 222 may perform various techniques, and utilize various ML algorithms, to train one or more resource-utilization models that represent resource-utilization characteristics representative of the workloads 120 in each workload category 220. In this way, when a new workload 120 needs to be categorized for purposes of identifying optimized VM instance types 130, the resource-utilization data 132 for a workload 120 may be mapped to the resource-utilization model that is "closest" or "most near" (e.g., neural network models) the fingerprint of the resource-utilization data 132 for the workload 120. The ML component 222 may utilize any type of ML algorithm or technique to train the resource-utilization models.

The computer-readable media 206 may further store the optimization component 126 configured to perform techniques described above for mapping resource-utilization data 132 to the appropriate workload categories, such as machine-learning methods or ruled based methods. For example, the optimization component 126 may compare utilization by the workload 120 for one or more dimensions of compute (e.g., CPU, GPU, memory, disk, and/or network throughput) with the resource-utilization models to identify closest match across the one or more dimensions of compute. The optimization component 126 may further determine which of the VM instance identifiers are associated with the workload categories, and provide the user(s) 106 with indications of the optimized VM instance types 130 that are optimized for their workload 120.

The computer-readable media 206 may further store the recommendation engine 124 that is configured to generate and provide recommendation data 132 to the user device 108 to provide VM instance type 130 recommendations on which to launch workloads 120, and also migration schedules according to which workloads 120 are to be migrated. The recommendation engine 124 may generate recommendation data 132 including VM instance types 130, and details around a migration schedule (e.g., timing regions, dates, etc.). The recommendation engine 124 may, if the user 106 opts in for a recommendation, provide recommendation data 132 to the user devices 108 to help users 106 select a recommended migration schedule for migrating workloads 120 between VM instance types 130.

The computer-readable media 206 may include a migration component 224 configured to perform at least some of the migration techniques described herein. The migration component 224 may include a pattern recognizer 226, which is generally an engine or component configured to identify utilization patterns in resource-utilization data 132. The pattern recognizer 226 may be configurable, but is generally able to determine patterns of resource utilization over a period of time. For instance, the pattern recognizer may determine that utilization for a timeframe is within a threshold range (e.g., 10% variance, 20% variance, etc.), and also identify significant changes in utilization (e.g., 30% increase, 40% decrease, etc.). The pattern recognizer 226 may identify patterns of utilization that repeat themselves, and also identify periods of time over which the patterns repeat (e.g., hours, days, weeks, months, years, etc.). The pattern recognizer 226 may then generate a utilization pattern that indicates resource utilization values (across one or more resource types), and timeframes for the different resource utilization values.

The migration component 224 may then generate migration schedules 228 based on the patterns and migration rules 220. For instance, the migration component 224 may work in conjunction with the optimization component 126 to find VM instance types 130 that are optimized to host the workloads for the different timeframes. Additionally, the migration component 224 may utilize various migration rules 220 created by the users 106 to determine the VM instance types 130 and/or parameters around creating the migration schedule 228. Thus, the migration component 224 may generate migration schedules 228 that can be recommended to users 106, and/or provided to the compute-management service 144.

The computer-readable media 206 may further store code for the compute-management service 144, which may be implemented by one, or multiple, computing devices 112 of the service provider network 102. Generally, the compute-management service 144 may be a service of the service provider network 102 that provides secure, resizable compute capacity and manages the computing resources of the computing-resource network 110. The compute-management service 134 may be referred to in various implementations as an elastic compute service, a virtual machines service, a computing cloud service, a compute engine, or a cloud compute service. In some examples, the compute-management service 144 may perform various functions for managing the computing-resource network 110, such as provisioning VM instances 114, migrating workloads 120 between VM instances 114/116, providing auto-scaling for fleets of VM instances 114/116, configuring VM instances 114/116 and/or workloads 120, and/or performing any other functions for managing the computing-resource network 110. In some instances, the compute-management service 144 may receive commands from the optimization service 104 for managing the workloads 120 to new VM instance types 130 for users 106 of the service provider network 102.

In some examples, the compute-management service 144 may include an auto-scaling component that, when executed by the processor(s) 202, scales up or down the number of instances 114 available to support one or more workloads 120 (and/or instances 116 when migrating workloads 120). For example, the auto-scaling component may provide a fast, efficient, and accurate way to match fleet capacity to usage. In some examples, the auto-scaling component may track the fleet's hosting metrics and determine when to add or remove instances 114/116 based on a set of guidelines, called policies. The auto-scaling component can adjust capacity in response to changes in demand to help ensure that the fleet of instances 114/116 has availability for bursts without maintaining an excessive amount of idle resources.

To utilize the services provided by the service provider network 102, users 106 may register for an account with the service provider network 102. For instance, users 106 may utilize a user device 108 to interact with an identity and access management (IAM) component 230 that allows the users 106 to create user accounts 232 with the service provider network 102. Generally, the IAM component 230 may enable the users 106 to manage their workloads 120 and other computing resources securely. Using the IAM component 230, the users 106 may manage their VM instances 114/116 as described herein. Additionally, users 106 may perform various operations for interacting with the optimization service 104 via their user accounts 232, such as providing input data 142, receiving recommendation data 132, proving input data indicating selections of VM instance types 130, and/or other interactions may be authorized via credentials required to access the user accounts 232.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and any components included therein, may be supported by one or more server devices. Stated otherwise, some or all of the operations performed by the service provider network 102, and any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
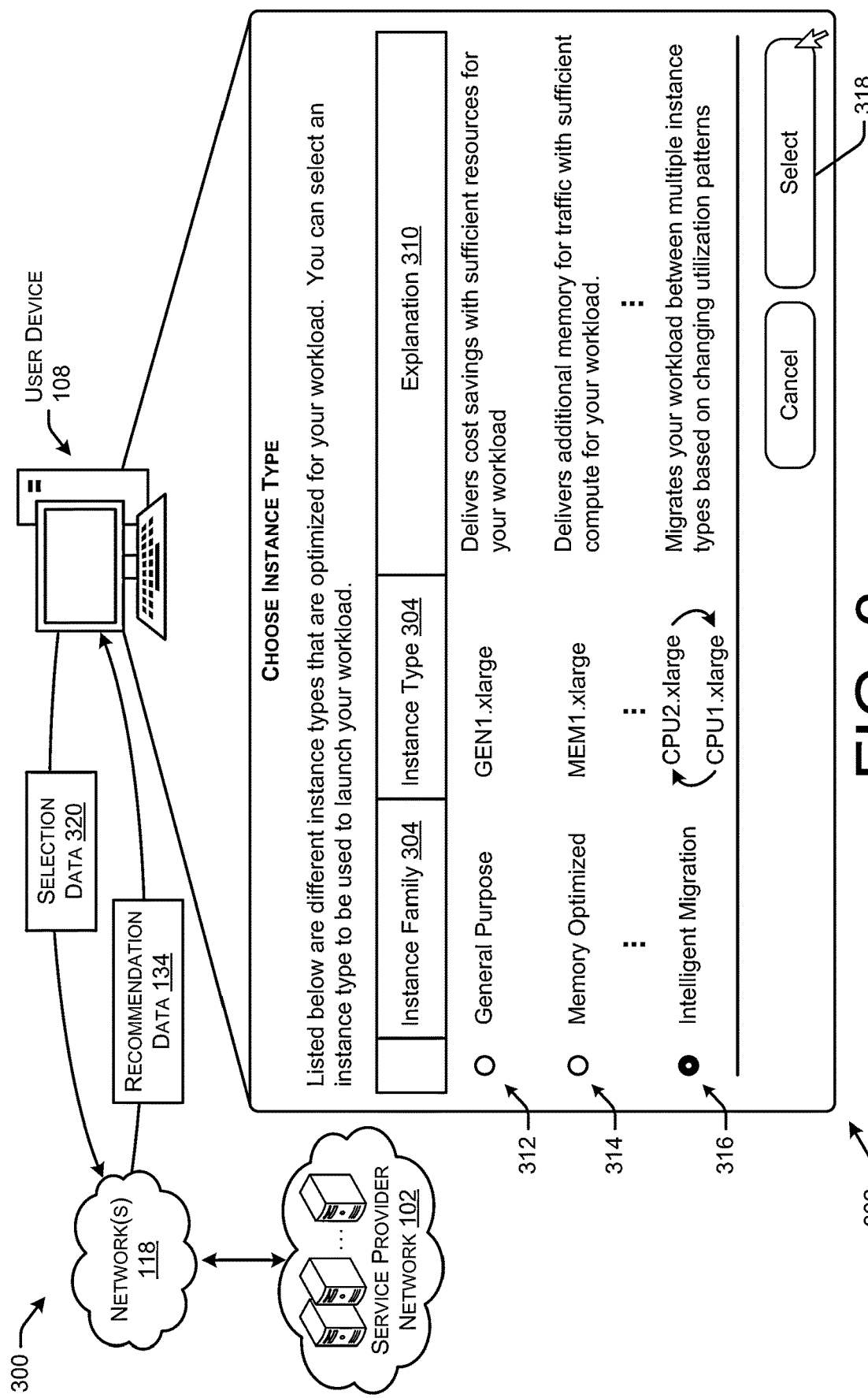
FIG. 3 illustrates a graphical user interface through which a user of a service provider network can select between difference instance types for their workload, and can also decide to opt-in for use of an intelligent migration option where the workloads are migrated between instance types based on changing utilization patterns.

FIG. 3 illustrates an environment 300 including a graphical user interface (GUI) 302 through which a user 106 of a service provider network 102 can select between difference instance types for their workloads 120, and can also decide to opt-in for use of an intelligent migration option where the workloads 120 are migrated between instance types based on changing utilization patterns.

The GUI 302 may indicate that the different instance types 130 are optimized for their workload 120, and they can select from the different options for hosting their workload 120. The GUI 302 may indicate the instance family 304 to which each of the options belong, as well as the exact instance types 304 that are being recommended, along with explanations 310 as to why the different VM instance types 130 are optimized for hosting the workloads 120. As illustrated, the options may include a general-purpose instance 312, a memory-optimized instance 314, and an intelligent-migration option 316. The intelligent-migration option 316 may be associated with two (or more) VM instance types 130 that the workloads 120 of the user 106 are to be migrated between based on changing utilization patterns of the workloads 120. The user 106 may select the intelligent-migration option 316, and provide input via a section option 318 indicating that the user 106 would like to use the intelligent-migration option 316. The user device 108 may then send selection data 320 to the service provider network 102 that indicates a request to opt-in for the intelligent-migration option 316.

It should be understood that the GUI 302 is merely illustrative and any type of user interface, or combination of user interfaces, may be utilized to prompt a user 106 for selecting the intelligent-migration option 316. Additionally, any type of input mechanism may be used to receive input that can be used to make selections.

FIG. 4 illustrates a GUI 400 through which a user 106 of a service provider network 102 can define parameters for a migration rule according to which VM instances types 130 are selected for the workload 120 to be migrated between.

As illustrated, the user 106 may use a workload option 402 through which they can indicates which one of their workloads the migration rule 220 is to be applied. The user 106 can then determine performance targets 404 for one or more of the different computing resource types. The performance targets 404 generally indicate a desired balance between low cost and increased performance. That is, a user 106 may specify, for multiple different computing resource types 406, 408, 410, and 412, whether they would like to err on low cost or increased performance. Generally, a workload 120 can run on VM instance types 130 that are allocated more or less of a particular computing resource type based on how optimized a user 106 desires the workload 120 to be for that computing resource type. For instance, the user 106 may desire that their workload 120 be optimized for storage 410 such that the VM instance type 130 is allocated a larger amount of storage 410 to ensure there is no throttling on storage 410 by the workload 120, but this may result in higher cost for the VM instance type 130 being allocated higher amounts of storage 410. Accordingly, the user 106 may specify whether they would like to ensure higher amounts of available computing resource types, or if they would like less available computing resource types and less cost.

As illustrated, the lower the user 106 selects for the performance targets, the less cost to find a VM instance type 130 that can support the workload 120, but the higher risk the workload 120 is throttled for the computing resource type. Conversely, the higher performance that the user 106 selects, the less risk associated with the workload 120 performing poorly and being throttled by lack of available resources, but the higher the cost. The user 106 may use input mechanisms to select performance targets 404 for one or more of a compute target 406, a memory target 408, a storage target 410, and/or a network I/O target 412. These performance targets 404 may be utilized when selecting VM instance types 130 in order to ensure that the selected VM instance types 130 will be able to provide sufficient computing resources to achieve the performance targets for the different timeframes that they are used to host the workloads 120. In some instances, the user 106 may also select a desired processor type 414 on which they would like to have their workloads 120. In this way, the migration of the workloads 120 may result in the workloads being hosted on hardware that the workloads 120 are compatible with (e.g., processors that can run the workloads 120).

In some instances, the user 106 may interact with an instance-types option 416 through which they may define what instance types 130, instance type families, etc., are allowed to be used to host their workloads 120. For instance, the user 106 may provide input via the instance-types option 416 that limits the usable VM instance types 130 to ensure that their workloads 120 are hosted on VM instance types 130 that they prefer.

In some examples, the user may select an option 418 where they enroll in use of automate migration techniques. In such instances, the migration component 224 may monitor the workload 120 and the utilization data 132 in order to automate the migration of the workload 120 to optimized VM instance types 130. Rather than requesting that the user 106 provide input regarding migration schedules moving forward, the migration component 224 may determine optimized VM instance types 130 for the workload 120 and adjust the migration schedule based on changes in the resource consumption by the workloads 120. In this way, the user can simply enroll for use of migration schedules and the migration component 224 may continue to select optimized VM instance types 130 and modify the migration schedules for the workloads 120 without receiving further user input from the user 106. In other examples, the user 106 may select a manual-migration option 420 where the migration component 224 determines that a new migration schedule is needed, and requests the user 106 approve, modify, and/or reject the new migration schedule. The user 106, when finished, may select the generate schedule option 422, and the migration component 224 may generate a migration rule 220 that is in turn used to create a migration schedule 228.

It should be understood that the GUI 400 is merely illustrative and any type of user interface, or combination of user interfaces, may be utilized to prompt a user 106 for defining parameters of a migration rule 220. Additionally, in some instances the migration component 224 may have default migration rules 220 and does not need to collect some or all of the data input via the GUI 402.

Figure 5:
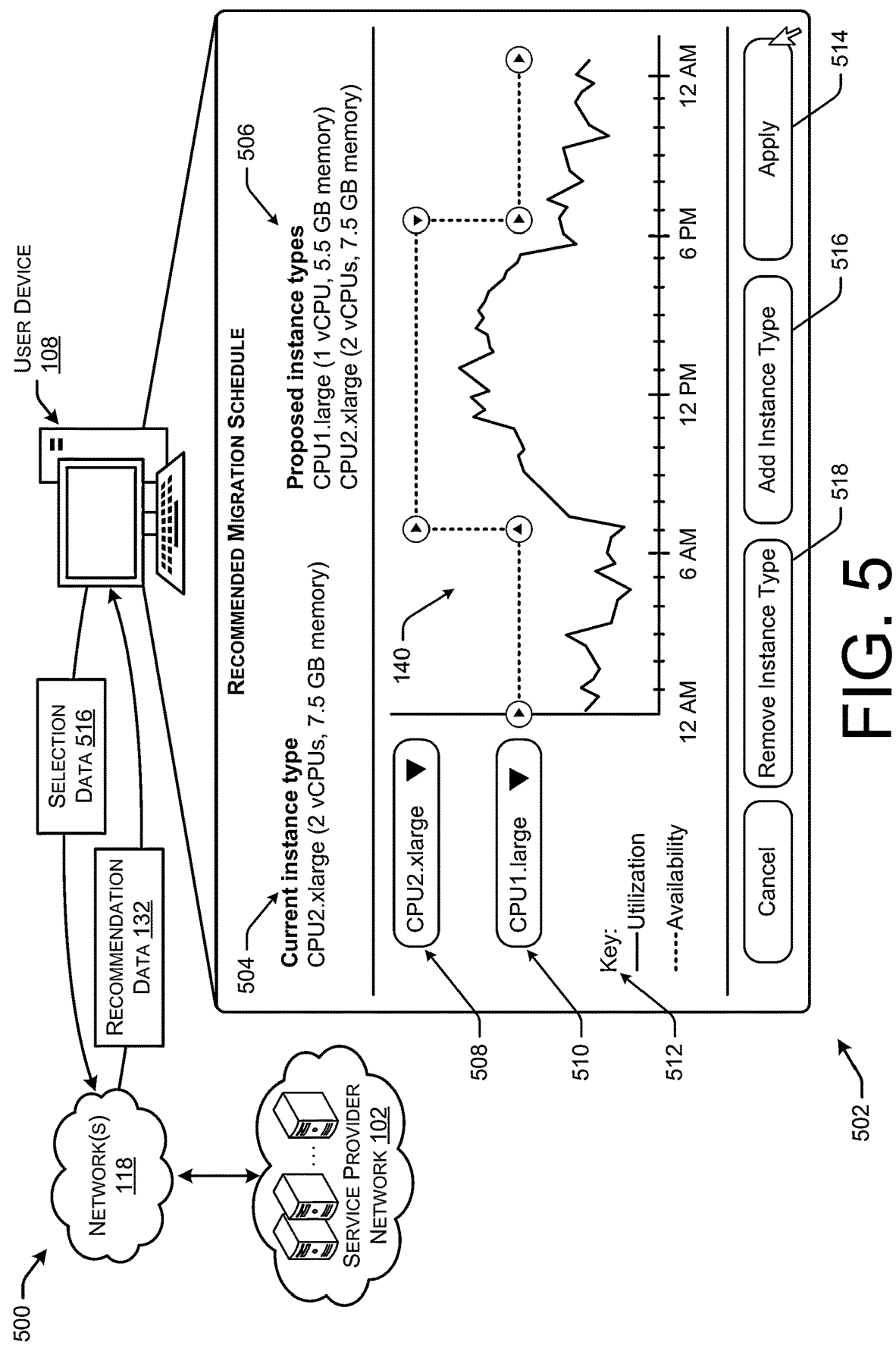
FIG. 5 illustrates a graphical user interface through which a user of a service provider network can review a recommended migration schedule for their workload.

FIG. 5 illustrates an environment 500 in which a graphical user interface 502 is presented on a user device 108 through which a user 106 of a service provider network 102 can review a recommended migration schedule for their workload 120 over a period of time.

As illustrated, the GUI 502 presents an indication of the current instance type 504 being used to host the workload 120, as well as proposed instances types 506 in the recommended migration schedule. The GUI 502 may include a first instance option 508 through which the user 106 can change the first recommended instance type 130, as well as a second option 510 through which the user 106 can change the second recommended instance type 130. A key 512 illustrates which lines are VM instance availability and which lines are average utilization by the workloads 120. The recommended migration schedule 140 may be presented on the display of user device 108. The user 106 can modify the recommended VM instance types 130.

In some examples, the user may be presented with an add-instance type option 516 as well as a remove-instance type option 518. The user 106 may be able to select the add-instance type option 516 and add one or more VM instance types 130 to their migration schedule 228, and may adjust the timing of the migrations for the different VM instance types 130. Additionally, the user 106 may interact with the remove-instance type option 518 and remove one or more of the VM instance types 130 and/or migrations in their migration schedule 228. In this way, the user 106 can provide additional input to change what VM instance types 130 are used in the migration schedule 228, as well as add and/or remove different VM instance types 130 to and from their migration schedule 228.

If the user 106 is satisfied with the recommended migration schedule 140, the user 106 can select the apply option 514 indicated that they would like to apply the migration schedule 228. The user device 108 may then send selection data 516 to the service provider network 102 indicating that the user 106 would like to use the migration schedule 228. The service provider network 102 may then begin migrating the workloads 120 of the user 106 according to the migration schedule 228.

Figure 6:
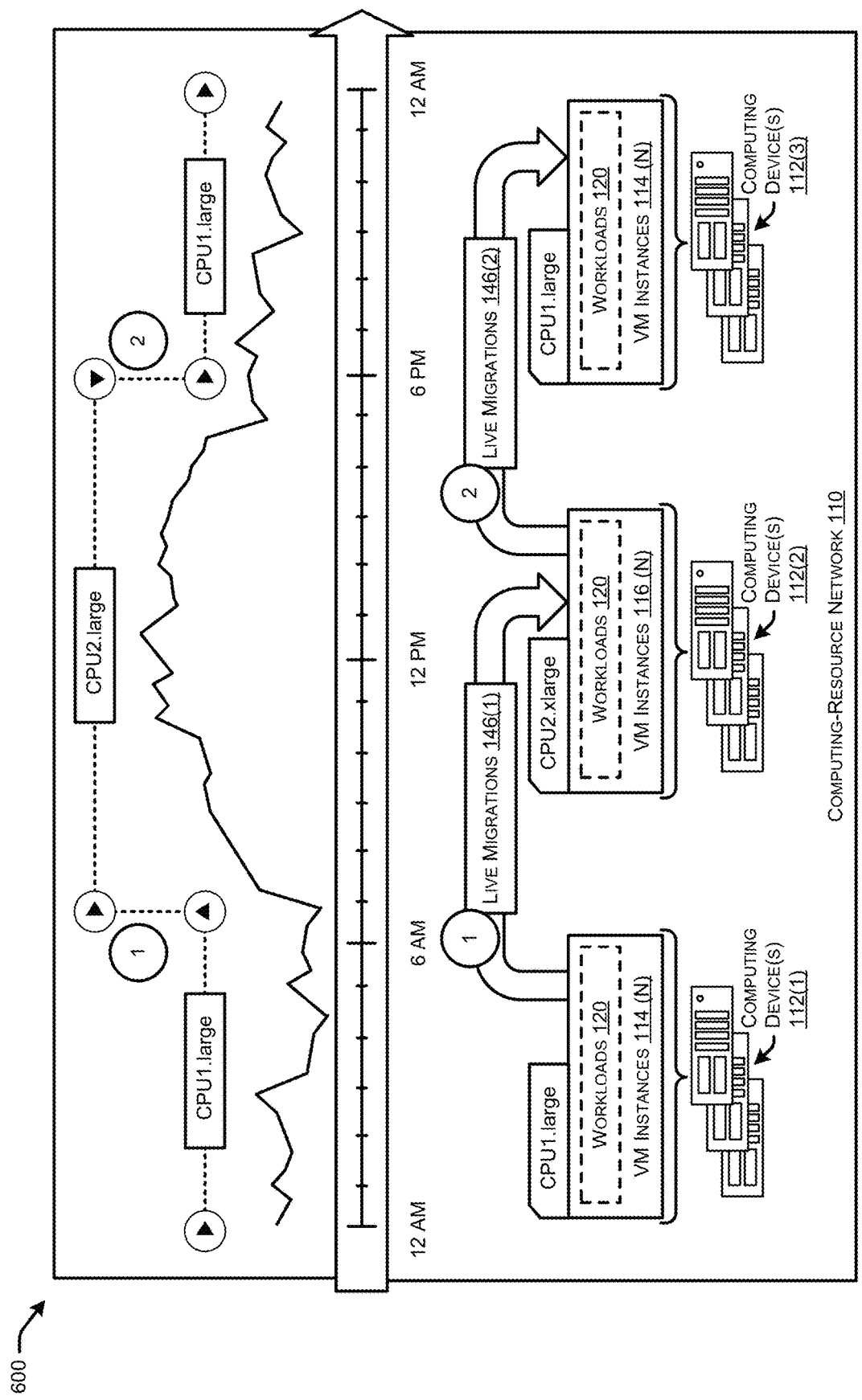
FIG. 6 illustrates a system-architecture diagram of a service provider network that migrates a fleet of workloads between VM instances according to utilization characteristics of the workloads over a period of time.

FIG. 6 illustrates a system-architecture diagram 600 of a service provider network 102 that migrates a fleet of workloads 120 between VM instances 114/116 according to utilization characteristics of the workloads 120 over a period of time.

As illustrated, over the period of time (e.g., a day), the fleet of workloads 120 may be migrated to different VM instances 114/116 that are of different VM instance types 130. In the illustrated example, the workloads 120 may initially be running on a VM instance type 130 called "CPU1.large" until around 8:00 AM. At step "1," the compute-management service 144 may perform a live migration 146(1) of the fleet of workloads 120 from the VM instances 114 of the first VM instance type 130(1) to VM instances 116 that are of a second VM instance type 130(2). The second VM instance type 130(2) is, in this example, called "CPU2.xlarge," and may be allocated additional amounts of computing resources (e.g., CPU, memory, storage, etc.) as compared to the first VM instance type 130(1) "CPU1.large." The fleet of workloads 120 may be hosted on the VM instances 116 of the second VM instance type 130(2) until around 5:00 PM, or at step "2," where the management service 144 may perform a live migration 146(2) of the fleet of workloads 120 from the VM instances 116 of the second VM instance type 130(2) back to VM instances 114 that are of a first VM instance type 130(1).

In the illustrated example, the workloads 120 are migrated twice in a period of time based on the utilization pattern of the workloads 120. For instance, the workloads may support a virtual-desktop environment and increase resource utilization when clients log-on or otherwise start using the virtual-desktop client between 8:00 AM and 5:00 PM. However, it should be understood that any number of migrations 146 may occur for a period of time based on the utilization pattern of the workloads 120, and for any different number of VM instance types 130. Additionally, the migrations for workloads 120 may vary based on geographic region, for instance. For example, the utilization patterns may manifest themselves at different times based on time differences across the different geographic regions.

In some instances, the live migrations 146 may result in VM instance slots being occupied on two different devices 112 for the same workload 120 migration. Thus, the cost of migrating the workloads 120 for occupying two slots, as well as the amount of network resources used to transfer the workloads 120, may be considered when determining whether or not there are cost savings for the live migrations 146.

FIGS. 7A, 7B, 8, and 9 illustrate flow diagrams of example methods 700, 800, and 900 that illustrate aspects of the functions performed at least partly by the service provider network 102 as described in this disclosure. The logical operations described herein with respect to FIGS. 7A, 7B, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7A, 7B, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7B:
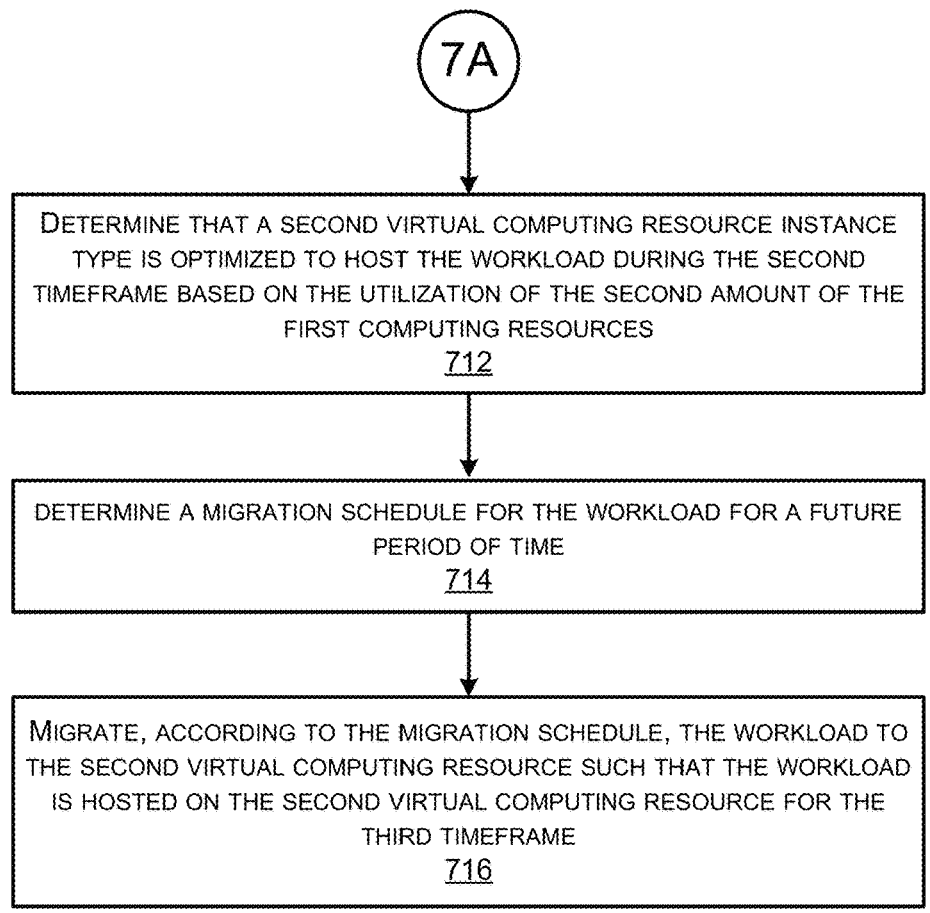

FIGS. 7A and 7B collectively illustrate a flow diagram of an example method 700 for a service provider network 102 to receive utilization data 132 for a workload 120, identify a historical utilization pattern by a workload 120, generate a migration schedule 228 using the historical utilization pattern, and migrate the workload 120 according to the migration schedule 228. As described herein, a virtual computing resource may comprise one or more of a VM instance, a virtual container, a program, and/or any other virtual representation At 702, the service provider network 102 may run a workload using a first virtual computing resource that is provisioned on first computing resources of a service provider network, the first virtual computing resource being of a first virtual computing resource type. As an example, the computing-resource network 110 of the service provider network 102 may be hosting the workload 120 on a virtual computing resource instance 114 that is provisioned on a computing device 112.

At 704, the service provider network 102 may receive historical utilization data that indicates utilization of the first computing resources by the workload over a previous period of time. For example, the service provider network 102 may obtain resource-utilization data 132 that indicates utilization of the first computing resources (e.g., resources of the computing device 112 allocated to the first VM instance 114) by the workload 120 over a previous period of time.

At 706, the service provider network 102 may analyze the historical utilization data to identify a historical utilization pattern in amounts of the first computing resources utilized by the workload during the previous period of time. For instance, the pattern recognizer 226 may identify a historical utilization pattern in amounts of the first computing resources utilized by the workload 120 during the previous period of time (e.g., an hour, a day, week, month, year, etc.).

At 708, the service provider network 102 may identify, from the historical utilization pattern, a first timeframe in the previous period of time during which a first amount of the first computing resources is utilized by the workload. At 710, the service provider network 102 may identify, from the historical utilization pattern, a second timeframe in the previous period of time during which a second amount of the first computing resources is utilized by the workload. For instance, the pattern recognizer 226 may identify different time frames during which different amounts of the computing resources are utilized by the workload 120. In some instances, the different amounts may be different by more than a threshold amount such that different VM instance types 130 would be advantageous for the different timeframes.

At 712, the service provider network 102 may determine that a second virtual computing resource instance type is optimized to host the workload during the second timeframe based on the utilization of the second amount of the first computing resources. For instance, the optimization component 126 may map utilization data collected during the second timeframe to the second VM instance type 130.

At 714, the service provider network 102 may determine the migration schedule for the workload for a future period of time. As an example, the migration component 224 may determine the migration schedule 228 for a future period of time where the migration schedule 228 includes an indication to migrate the workload to a second virtual computing resource of the second virtual computing resource type prior to a third timeframe that corresponds to the second timeframe.

At 716, the service provider network 102 may migrate, according to the migration schedule, the workload to the second virtual computing resource such that the workload is hosted on the second virtual computing resource for the third timeframe. For instance, the compute-management service 144 may perform a live migration 146 of the workload 120 to the second VM.

In some examples, the historical utilization data may indicate utilization of at least one of a central processing unit (CPU) resource type, a memory resource type, a storage resource type, or a network availability resource type.

In some examples, the method 700 may further include receiving, from a user account 232 registered with the service provider network 10, a request to provide a recommendation 134 of one or more VM instance types 130 that are optimized to support the workload 120, providing the user account 232 with access to recommendation data 132 that includes an indication of the migration schedule 220, and receiving, from the user account 232, an instruction to implement the migration schedule 228 for the workload 120.

Figure 8:
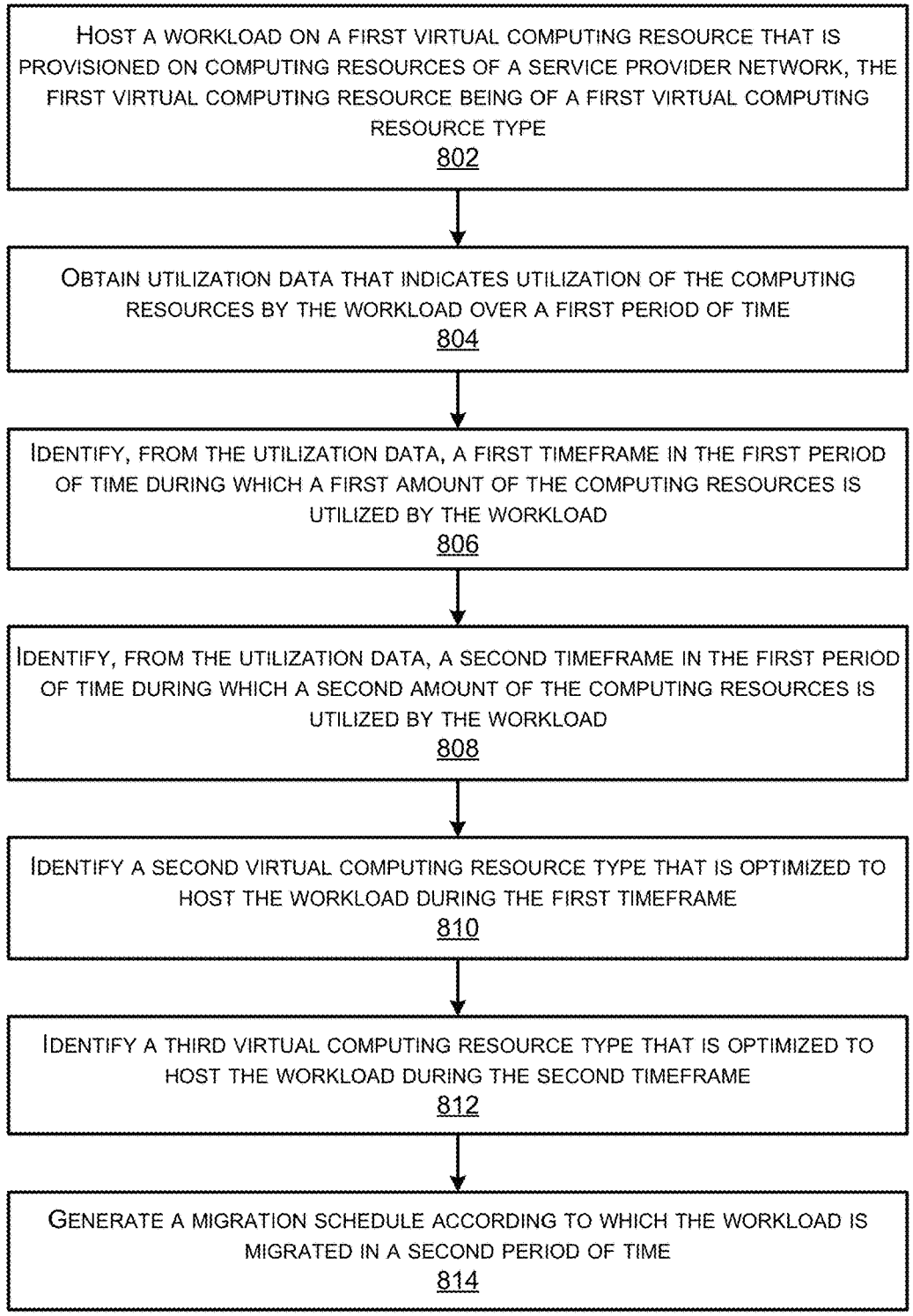
FIG. 8 illustrates a flow diagram of an example method for a service provider network to receive utilization data for a workload, identify a utilization pattern by a workload, and generate a migration schedule using the utilization pattern.

FIG. 8 illustrates a flow diagram of an example method 800 for a service provider network 102 to receive utilization data 132 for a workload 120, identify a utilization pattern by the workload 120, and generate a migration schedule using the utilization pattern.

As described herein, a virtual computing resource may comprise one or more of a VM instance, a virtual container, a program, and/or any other virtual representation. In some examples, the techniques of method 800 are performed using a system that includes a computing resource network 110 of a service provider network 102 that is managed by a service provider. The computing resource network 110 may be configured to support different VM instance types 130 configured to utilize different combinations of types of the computing resources to support workloads 120.

At 802, the service provider network 102 may host a workload on a first virtual computing resource that is provisioned on computing resources of a service provider network, the first virtual computing resource being of a first virtual computing resource type. As an example, the computing-resource network 110 of the service provider network 102 may be hosting the workload 120 on a VM instance 114 that is provisioned on a computing device 112.

At 804, the service provider network may obtain utilization data that indicates utilization of the computing resources by the workload over a first period of time. For example, the service provider network 102 may obtain resource-utilization data 132 that indicates utilization of the computing resources (e.g., resources of the computing device 112 allocated to the VM instance 114) by the workload 120 over a period of time.

At 806, the service provider network 102 may identify, from the utilization data, a first timeframe in the first period of time during which a first amount of the computing resources is utilized by the workload. At 808 the service provider network may identify, from the utilization data, a second timeframe in the first period of time during which a second amount of the computing resources is utilized by the workload. For instance, the pattern recognizer 226 may identify different time frames during which different amounts of the computing resources are utilized by the workload 120. In some instances, the different amounts may be different by more than a threshold amount such that different VM instance types 130 would be advantageous for the different timeframes.

At 810, the service provider network 102 may identify a second virtual computing resource type that is optimized to host the workload during the first timeframe. For instance, the optimization component 126 may map utilization data collected during the first timeframe to the second VM instance type 130.

At 812, the service provider network 102 may identify a third virtual computing resource type that is optimized to host the workload during the second timeframe. For instance, the optimization component 126 may map utilization data collected during the second timeframe to the third VM instance type 130.

At 814, the service provider network 102 may generate a migration schedule according to which the workload is migrated in a second period of time. As an example, the migration component 224 may determine the migration schedule 228 that includes a first indication to migrate the workload to a second virtual computing resource of the second virtual computing resource type prior to or during a third timeframe that corresponds to the first timeframe, and a second indication to migrate the workload to a third virtual computing resource of the third virtual computing resource type prior to or during a fourth timeframe that corresponds to the second timeframe.

Figure 9:
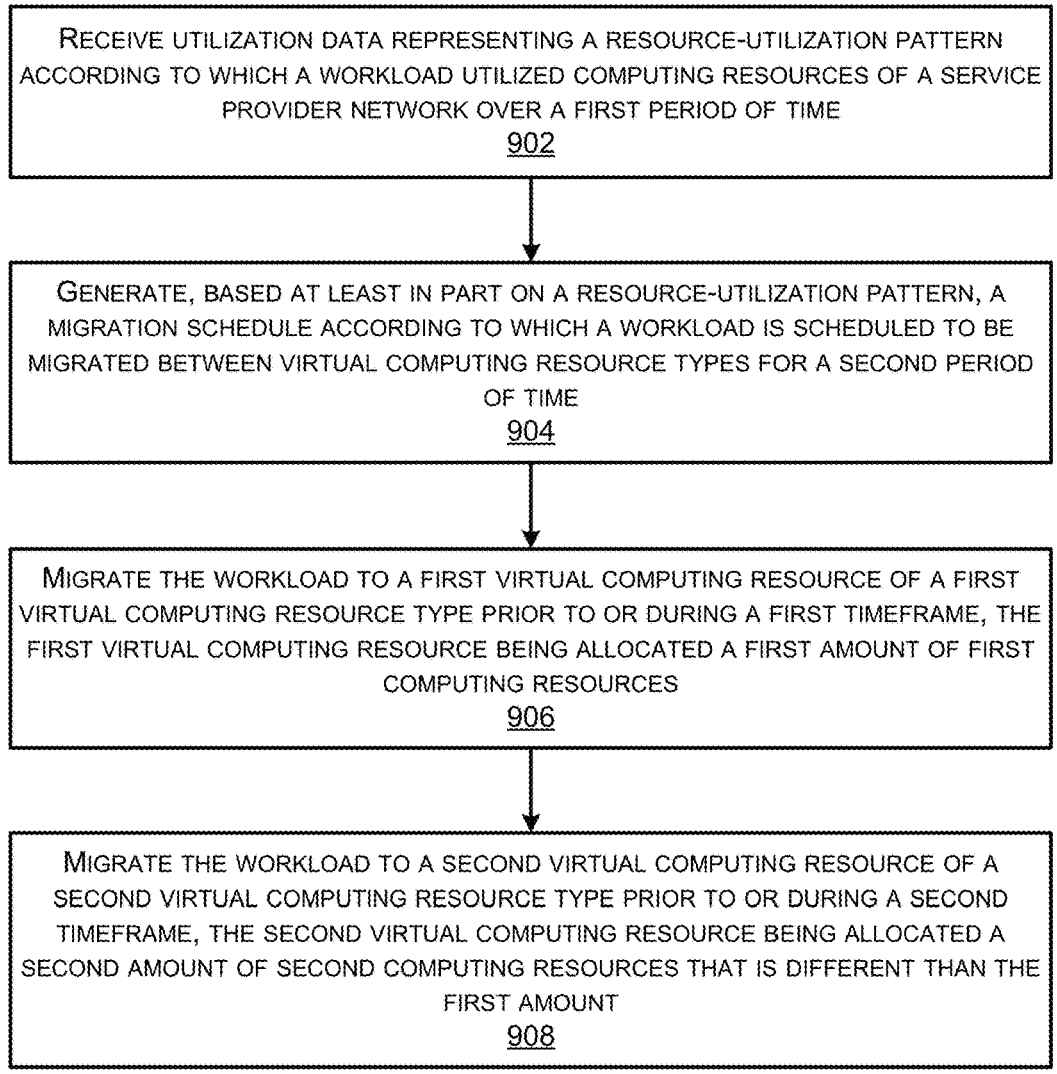
FIG. 9 illustrates a flow diagram of an example method for a service provider network to generate a migration schedule using a utilization pattern, and migrate a workload according to the migration schedule.

FIG. 9 collectively illustrate a flow diagram of an example method 900 for a service provider network 102 to generate a migration schedule 228 using a utilization pattern, and migrate a workload 120 according to the migration schedule 228.

At 902, the service provider network 102 may receive utilization data representing a resource-utilization pattern according to which a workload utilized computing resources of a service provider network over a first period of time;

At 904, the service provider network 102 generate, based at least in part on a resource-utilization pattern, a migration schedule according to which a workload is scheduled to be migrated between virtual computing resource types for a period of time;

At 906, the service provider network 102 may, during a second period of time, and according to the migration schedule, migrate the workload to a first virtual computing resource of a first virtual computing resource type prior to or during a first timeframe, the first virtual computing resource being allocated a first amount of first computing resources; and At 908, the service provider network 102 may, during a second period of time, and according to the migration schedule during or subsequent the first timeframe, migrate the workload to a second virtual computing resource of a second virtual computing resource type, the second virtual computing resource being allocated a second amount of second computing resources that is different than the first amount.

Figure 10:
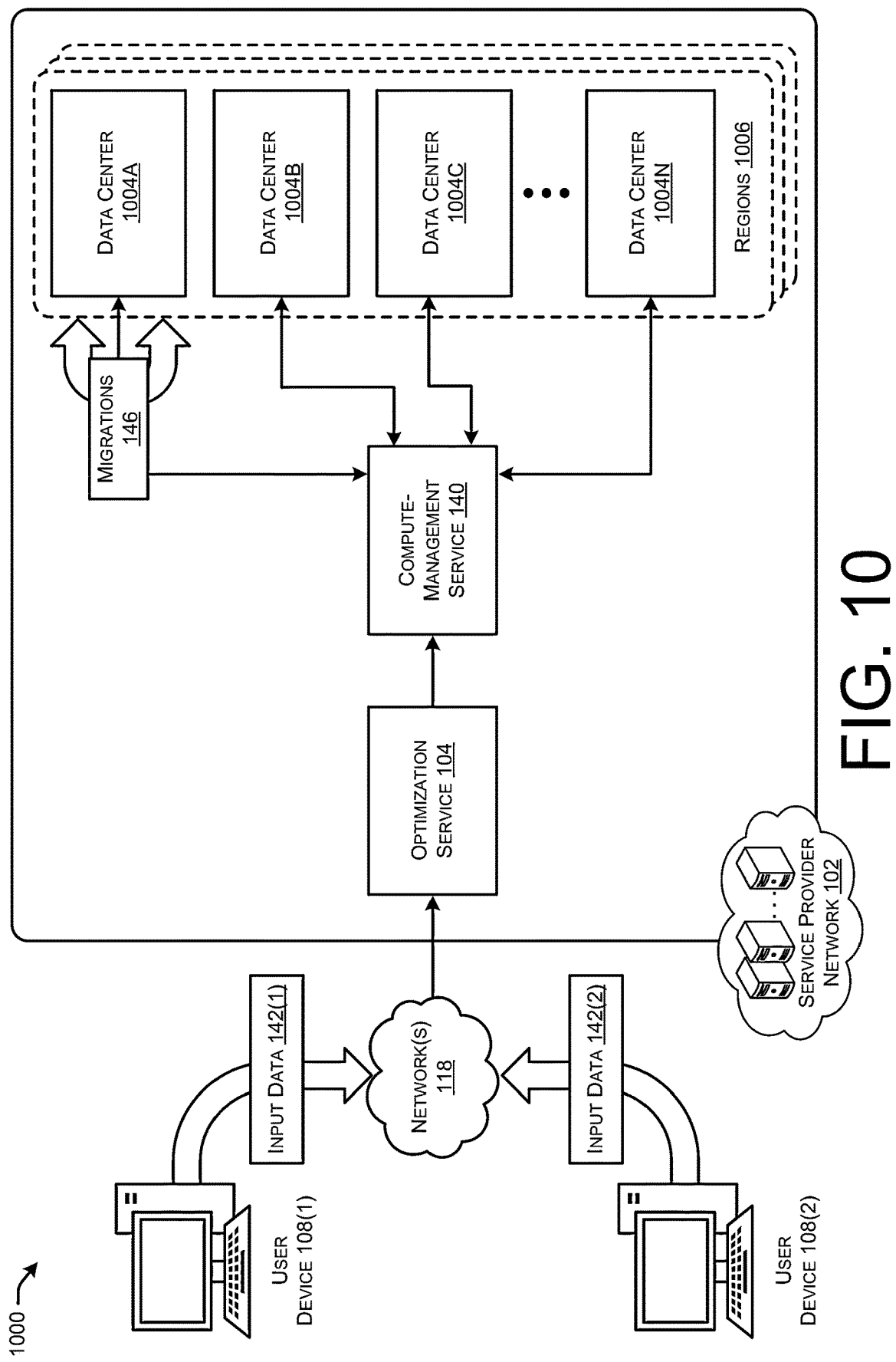
FIG. 10 is a system and network diagram that shows an illustrative operating environment that includes data centers of a service provider network that can be configured to implement aspects of the functionality described herein.

FIG. 10 is a system and network diagram 1000 that shows an illustrative operating environment that includes data centers 1004 in one or more regions 1006 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 11.

The users 106 of the user devices 108 that utilize the service provider network 102 may access the computing resources provided by the service provider network 102 over any wired and/or wireless network(s) 118, which can be a wide area communication network ("WAN"), such as the Internet, an intranet or an Internet service provider ("ISP") network or a combination of such networks. For example, and without limitation, a user device 108 operated by a user 106 of the service provider network 102 may be utilized to access the service provider network 102 by way of the network(s) 118. It should be appreciated that a local-area network ("LAN"), the Internet, or any other networking topology known in the art that connects the data centers 1004 to remote clients and other users can be utilized. It should also be appreciated that combinations of such networks can also be utilized.

As illustrated, user devices 108(1) and 108(2) may submit input data 142(1) and 120(2) for defining parameters for a migration schedule 140 in which multiple VM instances 114/116 are to host the workloads 120 in the computing-resource network 110. In some examples, the input data 142(1) and 142(2) may be associated with a same user account 232, or with different user accounts 232. The optimization component 126 may then instruct the compute-management service 144 to migrate 146 the workload 120 according to the migration schedule 140 for a period of time in order optimize the performance of the workloads 120 hosted on multiple VM instance types 130 in the data centers 1004.

Figure 11:
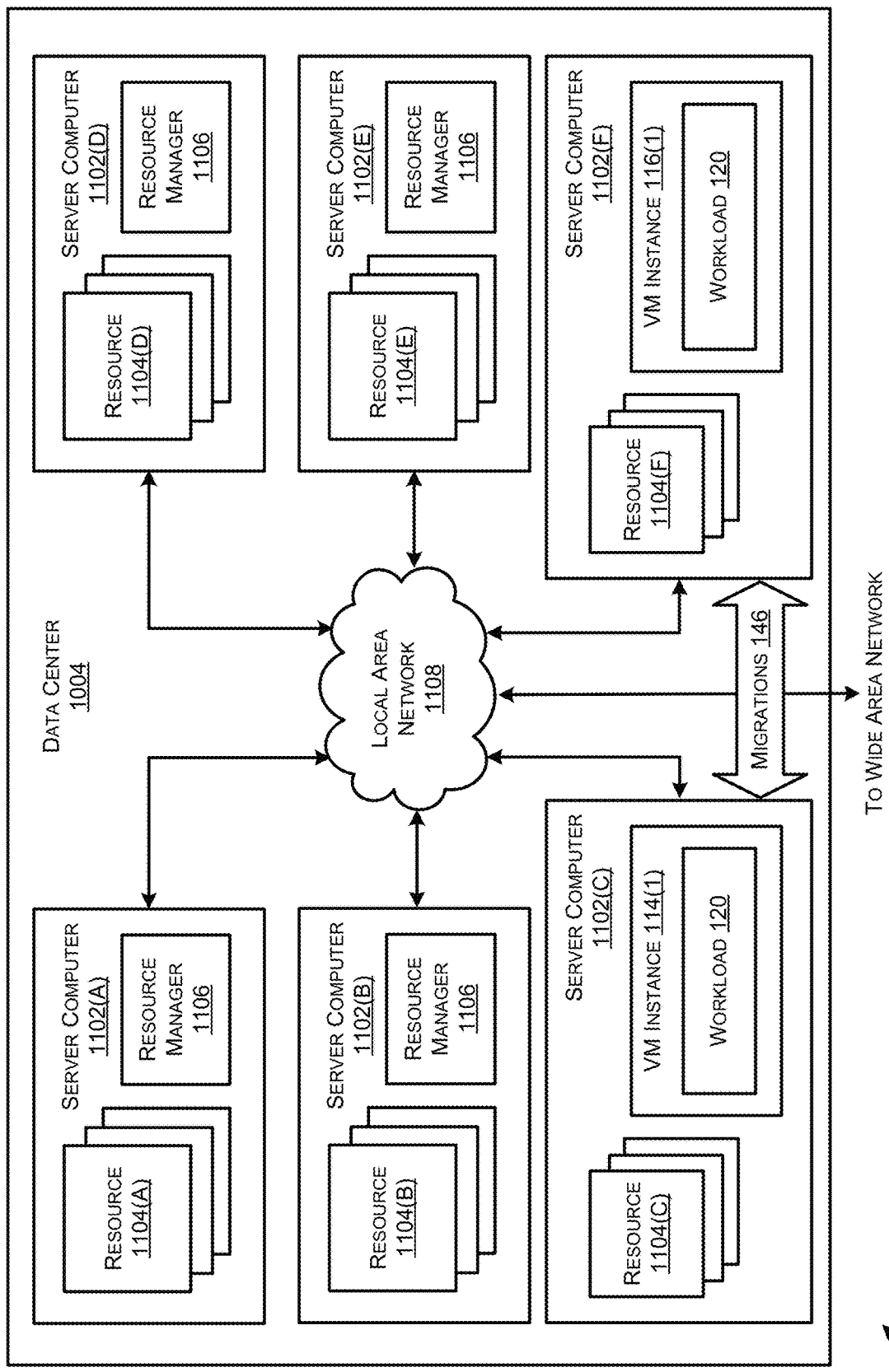
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices 112 described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

The data center 1004 shown in FIG. 11 also includes a server computer 1102F that can execute some or all of the software components described above. For example, and without limitation, the server computer 1102F (and the other server computers 1102) can generally be included in to the computing devices 112 of FIG. 1 and be configured to execute components, including the components of the optimization service 104, the compute-management service 144, the computing-resource network 110, and/or the other software components described above. The server computer 1102F can also be configured to execute other components and/or to store data for providing some or all of the functionality described herein. In this regard, it should be appreciated that the services illustrated in FIG. 11 as executing on the server computer 1102F can execute on many other physical or virtual servers in the data centers 1104 in various embodiments.

Figure 12:
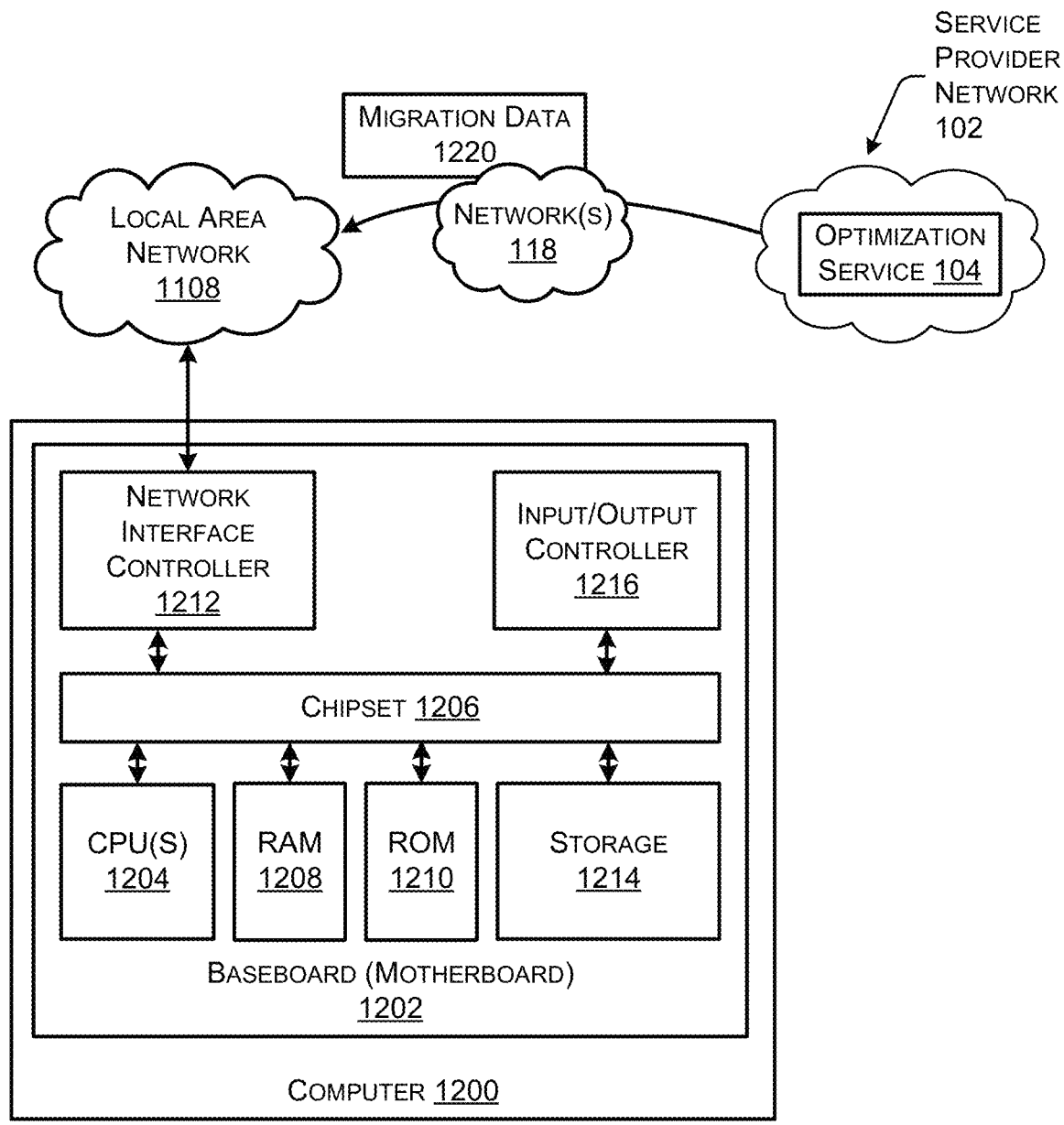
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. In some examples, the server computer 1200 may correspond to, or be the same as or similar to, a computing device 112 described in FIG. 1.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1108. The chipset 1206 can include functionality for providing network connectivity through a network interface controller (NIC) 1212, such as a gigabit Ethernet adapter. The NIC 1212 is capable of connecting the computer 1200 to other computing devices over the network 1108 (or 118). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the service provider network 102, and or any components included therein, may be supported by one or more devices similar to computer 1200. Stated otherwise, some or all of the operations performed by the service provider network 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

Generally, the computer 1200 may be an example of a computing device 112 (and other computing devices, servers, etc.) described herein. The CPU(s) 1204, RAM 1208, ROM 1210, storage 1214, bandwidth of the NIC 1212, and/or other resources of the computer 1200 may be allocated to one or more different VM instances 114 as described herein based on the VM instance types 130.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

As illustrated, the service provider network 102 may send migration data to the computer 1200 that causes the computer 1200 to either host a workload (e.g., receive the migrated workload 120), or stop hosting the workload 120 and migrate the workload 120 to a different computer/server.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for migrating a workload according to a migration schedule, the method comprising:
    running the workload using a first virtual machine that is provisioned on first computing resources of a service provider network, the first virtual machine being of a first virtual machine type that is allocated use of a first predefined amount of the first computing resources of the service provider network;
    receiving historical utilization data that indicates utilization of the first computing resources by the workload over a previous period of time;
    analyzing the historical utilization data to identify a historical utilization pattern in amounts of the first computing resources utilized by the workload during the previous period of time;
    identifying, from the historical utilization pattern, a first historical timeframe in the previous period of time during which a first amount of the first computing resources is utilized by the workload;
    identifying, from the historical utilization pattern, a second historical timeframe in the previous period of time during which a second amount of the first computing resources is utilized by the workload;
    determining that a second virtual machine type is more optimal than the first virtual machine type for hosting the workload during the second historical timeframe based on the second amount of the first computing resources, the second virtual machine type being allocated a second predefined amount of the first computing resources that are more optimal for hosting the workload during the second historical timeframe than the first predefined amount;
    determining the migration schedule for the workload for a future period of time, the migration schedule including an indication to migrate the workload to a second virtual machine of the second virtual machine type prior to a future timeframe, wherein the future timeframe corresponds to the second historical timeframe; and
    migrating, according to the migration schedule, the workload to the second virtual machine such that the workload is hosted on the second virtual machine for the future timeframe.

2. The method of claim 1, wherein:
    the historical utilization data indicates utilization of a central processing unit (CPU) resource type, a memory resource type, a storage resource type, or a network availability resource type;
    the previous period of time comprises one of a previous day, a previous week, or a previous month; and
    the future period of time comprises one of a future day corresponding to the previous day, a future week corresponding to the previous week, or a future month corresponding to the previous month.

3. The method of claim 1, wherein:
    the first virtual machine type comprises a non-burstable virtual machine type that is allotted a first fixed quantity of the first computing resources; and
    the second virtual machine type comprises a burstable virtual machine type that is allocated a second fixed quantity of the second computing resources and a periodic availability of a variable quantity of the second computing resources.

4. The method of claim 1, further comprising:
    receiving, from a user account registered with the service provider network, input indicating a threshold utilization percentage of a particular computing resource type allocated to virtual machines of which utilization by the workload is not to exceed;
    determining that the second virtual machine type is allocated a third amount of the particular computing resource type such that utilization of the first amount of the particular computing resource by the workload is less than the threshold utilization percentage; and
    determining that the third virtual machine type is allocated a fourth amount of the particular computing resource type such that utilization of the second amount of the particular computing resource by the workload is less than the threshold utilization percentage.

5. A system comprising:
    one or more processors; and
    one or more computer-readable media storing computer-executable instructions that, when executed by the one or more processors, cause the one or more processors to perform operations comprising:
        analyzing utilization data representing computing resources used by a workload running on a first virtual machine type over a period of time in a service provider network, the first virtual machine type being allocated a first amount of computing resources;

identifying, based on analyzing the utilization data, a use pattern for the workload that occurred during a portion of the period of time;

identifying a second virtual machine type that is more optimal for running workloads exhibiting the use pattern than the first virtual machine type, the second virtual machine type being allocated a second amount of computing resources that is different than the first amount of computing resources;

predicting a future time at which the workload will exhibit usage within a threshold similarity to the use pattern; and generating a migration schedule to migrate the workload from the first virtual machine type to the second virtual machine type at or before the future time.

6. The system of claim 5, the operations further comprising migrating, according to the migration schedule, the workload to the second virtual machine type.

7. The system of claim 6, the operations further comprising:

receiving, from a user account registered with the service provider network, a request to provide a recommendation of one or more virtual machine types that are optimized to support the workload;

providing the user account with access to recommendation data that includes an indication of the migration schedule; and receiving, from the user account, an instruction to implement the migration schedule for the workload.

8. The system of claim 5, the operations further comprising:

receiving input data indicating a threshold utilization percentage of a particular computing resource type allocated to instances of which utilization by the workload is not to exceed; and determining that the second virtual machine type is allocated an amount of the particular computing resource type such that utilization of the amount of the particular computing resource by the workload is less than the threshold utilization percentage.

9. The system of claim 5, wherein:

the first virtual machine type comprises a non-burstable instance type that is allotted a first fixed quantity of computing resources; and the second virtual machine type comprises a burstable instance type that is allocated a second fixed quantity of computing resources and a periodic availability of a variable quantity of computing resources.

10. The system of claim 5, wherein the workload is part of a fleet of workloads being hosted in the service provider network, the operations further comprising:

migrating the fleet of workloads to a plurality of second virtual machine types such that the fleet of workloads is hosted on the plurality of second virtual machine types.

11. The system of claim 5, the operations further comprising:

determining that an amount of the computing resources utilized in a timeframe of the period of time is greater than or equal to a threshold utilization amount; and determining to migrate the workload to the second virtual machine type prior to or during the future time based at least in part on the amount of the computing resources being greater than or equal to the threshold utilization amount.

12. The system of claim 5, wherein:

the utilization data indicates utilization of a particular computing resource type, the particular computing resource type being one of a central processing unit (CPU) resource type, a memory resource type, a storage resource type, or a network availability resource type, the operations further comprising migrating the workload from the first virtual machine type to the second virtual machine type, wherein the second virtual machine type is allocated a greater amount of the particular computing resource type than the first machine type.

13. The system of claim 5, wherein:

the utilization data indicates utilization of a particular computing resource type, the particular computing resource type being one of a central processing unit (CPU) resource type, a memory resource type, a storage resource type, or a network availability resource type, the operations further comprising migrating the workload from the first virtual machine type to the second virtual machine type, wherein the first virtual machine type is allocated a lesser amount of the particular computing resource type than the second virtual machine type.

14. A method comprising:

receiving utilization data representing a resource-utilization pattern according to which a workload utilized computing resources of a service provider network over a first period of time;

generating, based at least in part on a resource-utilization pattern, a migration schedule according to which a workload is scheduled to be migrated between virtual machine types for a second period of time;

during the second period of time, and according to the migration schedule:

migrating the workload to a first virtual machine of a first virtual machine type prior to or during a first timeframe, the first virtual machine being allocated a first amount of first computing resources; and during or subsequent to the first timeframe, migrating the workload to a second virtual machine of a second virtual machine type prior to or during a second timeframe, the second virtual machine being allocated a second amount of second computing resources that is different than the first amount, wherein the second amount of the second computing resources is more optimal for hosting the workload during the second timeframe than the first amount of the first computing resources.

15. The method of claim 14, wherein:

the first virtual machine type comprises a non-burstable instance type that is allotted a first fixed quantity of the first computing resources; and the second virtual machine comprises a burstable instance type that is allocated a second fixed quantity of the second computing resources and a periodic availability of a variable quantity of the second computing resources.

16. The method of claim 14, further comprising:

receiving input data indicating a threshold utilization percentage of a particular computing resource type allocated to virtual machines of which utilization by the workload is not to exceed;

determining that the utilization of the first amount of the first computing resources by the workload is less than the threshold utilization percentage; and determining that utilization of the second amount of the second computing resources by the workload is less than the threshold utilization percentage.

17. The method of claim 14, further comprising:

obtaining historical utilization data that indicates utilization of the computing resources by the workload over different periods of time; and analyzing the historical utilization data to identify the resource-utilization pattern in amounts of the computing resources utilized by the workload during the different periods of time.

18. The method of claim 14, wherein the workload is part of a fleet of workloads being hosted in the service provider network, further comprising:

migrating the fleet of workloads to a plurality of first virtual machines of the first computing resource type such that the fleet of workloads is hosted on the plurality of first virtual machines for the first timeframe; and migrating the fleet of workloads to a plurality of second virtual machines of the second virtual machine type such that the fleet of workloads is hosted on the plurality of second virtual machines for the second timeframe.

19. The method of claim 14, further comprising:

determining that the first amount of the computing resources utilized in the first timeframe is greater than or equal to a threshold utilization amount; and determining to migrate the workload to the second virtual machine prior to or during the second timeframe based at least in part on the first amount of the computing resources being greater than or equal to the threshold utilization amount.

20. The method of claim 14, wherein:

the utilization data indicates utilization of a particular computing resource type, the particular computing resource type being one of a central processing unit (CPU) resource type, a memory resource type, a storage resource type, or a network availability resource type, further comprising migrating the workload from the first virtual machine to the second virtual machine, wherein the first amount of the particular computing resource type that is greater than the second amount of the particular computing resource type.

* * * * *